United States Patent
Sherkin

(10) Patent No.: US 8,566,702 B2
(45) Date of Patent: Oct. 22, 2013

(54) METHODS AND SYSTEMS OF OUTPUTTING CONTENT OF INTEREST

(75) Inventor: Alexander Sherkin, North York (CA)

(73) Assignee: BlackBerry Limited, Waterloo (CA)

( * ) Notice: Subject to any disclaimer, the term of this patent is extended or adjusted under 35 U.S.C. 154(b) by 174 days.

(21) Appl. No.: 12/885,816

(22) Filed: Sep. 20, 2010

(65) Prior Publication Data

US 2012/0072826 A1    Mar. 22, 2012

(51) Int. Cl.
*G06F 17/00* (2006.01)
*G06F 17/30* (2006.01)

(52) U.S. Cl.
USPC ........... 715/234; 715/205; 715/273; 715/760; 715/962; 707/602; 707/769; 707/E17.015

(58) Field of Classification Search
USPC ......... 715/200, 201, 202, 204–207, 209, 210, 715/226, 227, 229, 231, 234–236, 238, 239, 715/242, 243, 248, 249, 253, 255, 256, 273, 715/700, 730, 760, 762, 968, FOR. 176; 707/601, 602, 705, 759, 763, 769, 805, 707/912, 913, 999.001, 999.1, 999.2, 707/E17.013, E17.014, E17.015, E17.061, 707/E17.069, E17.118, E17.139, E17.14
See application file for complete search history.

(56) References Cited

U.S. PATENT DOCUMENTS

| | | | |
|---|---|---|---|
| 7,451,392 B1 | 11/2008 | Chalecki et al. | |
| 7,587,425 B2 * | 9/2009 | Baikov et al. | 1/1 |
| 7,596,622 B2 * | 9/2009 | Owen et al. | 709/230 |
| 7,870,482 B2 * | 1/2011 | Gnech et al. | 715/239 |
| 8,166,054 B2 * | 4/2012 | Fu et al. | 707/755 |
| 8,171,396 B2 * | 5/2012 | Sulistio et al. | 715/234 |
| 2002/0174178 A1 * | 11/2002 | Stawikowski | 709/203 |
| 2004/0015564 A1 * | 1/2004 | Williams | 709/219 |
| 2005/0038867 A1 * | 2/2005 | Henderson et al. | 709/217 |
| 2005/0071448 A1 * | 3/2005 | Katz et al. | 709/223 |
| 2006/0020657 A1 * | 1/2006 | Liu et al. | 709/201 |
| 2008/0189278 A1 * | 8/2008 | Akkiraju et al. | 707/6 |
| 2009/0132912 A1 * | 5/2009 | Sulistio et al. | 715/236 |
| 2010/0083095 A1 * | 4/2010 | Nikovski et al. | 715/234 |
| 2010/0228734 A1 * | 9/2010 | Murthy | 707/741 |

OTHER PUBLICATIONS

Frequently Asked Questions; Dapper, http://open.dapper.net/faqs.php.
Dr. Dobbs Portal, The WIDL Specification, Nov. 1, 1998, www.ddj.com/184410718.

(Continued)

*Primary Examiner* — Maikhanh Nguyen
(74) *Attorney, Agent, or Firm* — Ridout & Maybee LLP

(57) ABSTRACT

A method can output content of interest of a structured electronic document from a computer or distributed computer system having a processor and memory. The method includes loading a common expression and a data structure definition into memory, the common expression identifying a content element in a first structured electronic document, the data structure definition defined according to the common expression; creating in memory an instance of a data structure defined by the data structure definition; applying with the processor the common expression to a second structured electronic document to extract a content element from the second structured electronic document; storing the extracted content element in the instance of the data structure; and populating a template structured electronic document using the instance of the data structure to produce an output structured electronic document.

14 Claims, 26 Drawing Sheets

(56) References Cited

OTHER PUBLICATIONS

Chamberlain, Darren, CPAN, Treat Google as a datasource for DBI, http://search.cpan.org/~darren/DBD-Google-0.11/lib/DBD/Google.pm.

Leslie Marable, Building Blocks, Turning the Web into a Data Source, Apr. 21, 1997, http://xml.coverpages.org/widlBuildingBlocks.html.

Mike Chambers, Using the HTML Contol Class in Adobe AIR to parse HTML as a data source, www.mikechambers.com/blog/2007/11/09/using-the-htmlcontrol-in-adobe-air-to-par . . . .

W3C, Web Interface Definition Language (WIDL), Submitted to W3C Sep. 22, 1997, http:/w3.org/TR/NOTE-widl-970922.

"Introduction to RSS"; http:www.webreference.com/authoring/languages/xml/rss/intro/.

"Introduction to XML Schema", http://www.w3schools.com/schema/schema_intro.asp.

Driessen Irene & Smith, Simon, "What is Resource Description Framework?"; http://searchsoa.techtarget.com/sDefinition/0,,sid26_gci213545,00.html.; Last updated Jul. 27, 2001.

* cited by examiner

METHODS AND SYSTEMS OF OUTPUTTING CONTENT OF INTEREST

The present description relates to methods and systems for extracting content from a structured electronic document.

LIMITED COPYRIGHT WAIVER

A portion of the disclosure of this patent document contains material to which the claim of copyright protection is made. The copyright owner has no objection to the facsimile reproduction by any person of the patent document or the patent disclosure following publication of the application, as it appears in the U.S. Patent and Trademark Office file or records, but reserves all other rights whatsoever.

BACKGROUND

It can be desirable to access content from a structured electronic document, for example to utilize the content for another purpose. Identifying the content within the structured electronic document so that it can be accessed in an automated fashion, for example programmatically, can be a laborious process.

Often one goes back to the original source of the content and retrieves it from the source. In many cases the source is not available for access, or determining how to gain such access makes access impractical.

It is desirable to provide improved or alternate methods of identifying such content. It is also desirable to provide improved or alternate methods, tools and systems to assist with the identification of content within structured electronic documents.

BRIEF DESCRIPTION OF THE DRAWINGS

Reference will now be made, by way of example, to the accompanying drawings which show example embodiments, and in which.

Like reference numerals may be used in different figures to denote like components.

DESCRIPTION OF EXAMPLE EMBODIMENTS

Figure 1:
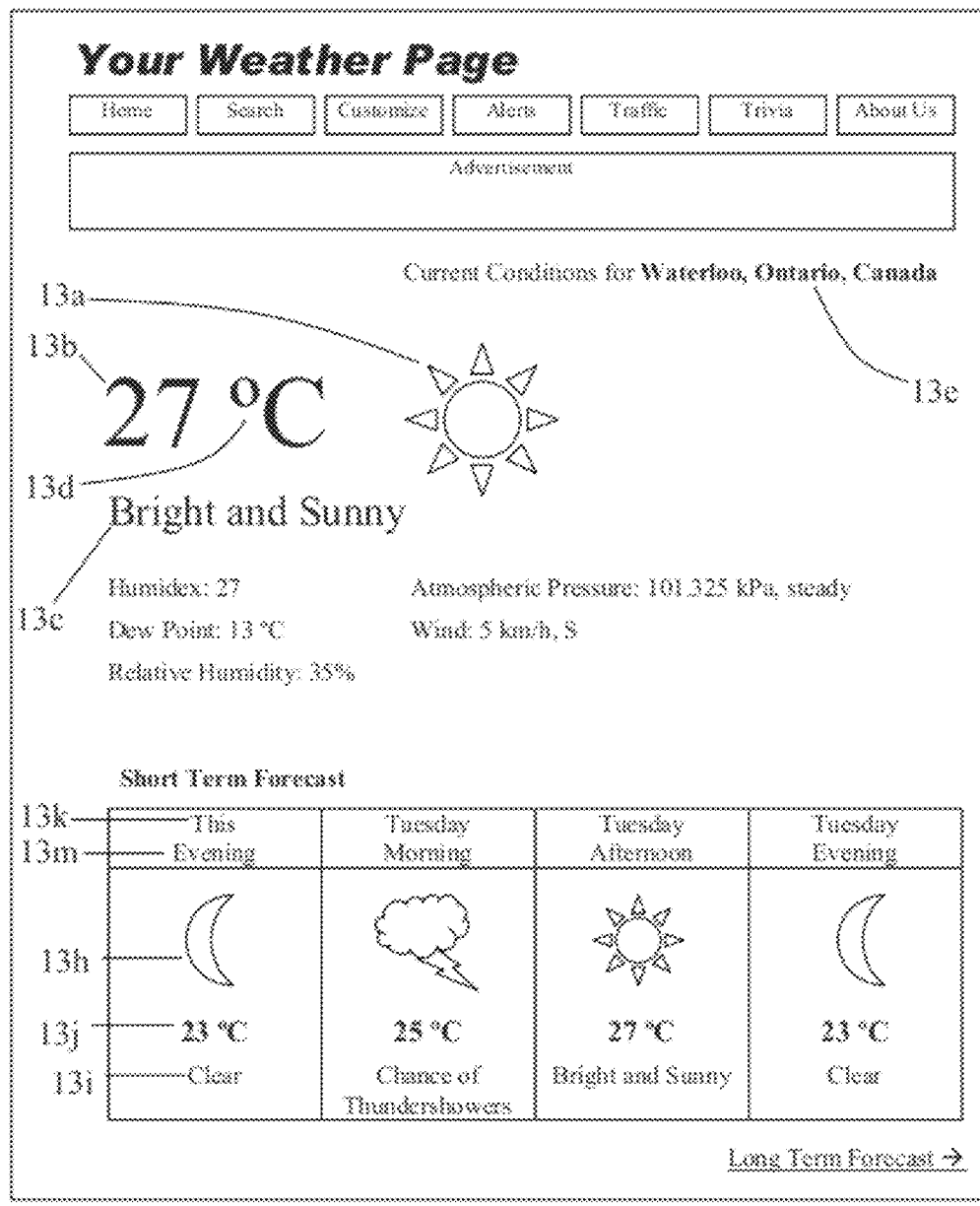
FIG. 1 illustrates an example content elements user interface screen of a rendered version of a prior art structured electronic document containing content elements for use in association with an example content extraction document of FIG. 16.

Referring to FIG. 1, an example browser page 14 displays weather information for Waterloo, Ontario. Such a page 14 displays specific content elements 13. In this description content elements 13 are referred to generically using reference numeral 13. A specific content element may be referred to using reference numeral 13 followed by a letter, for example 13a.

Figure 2:
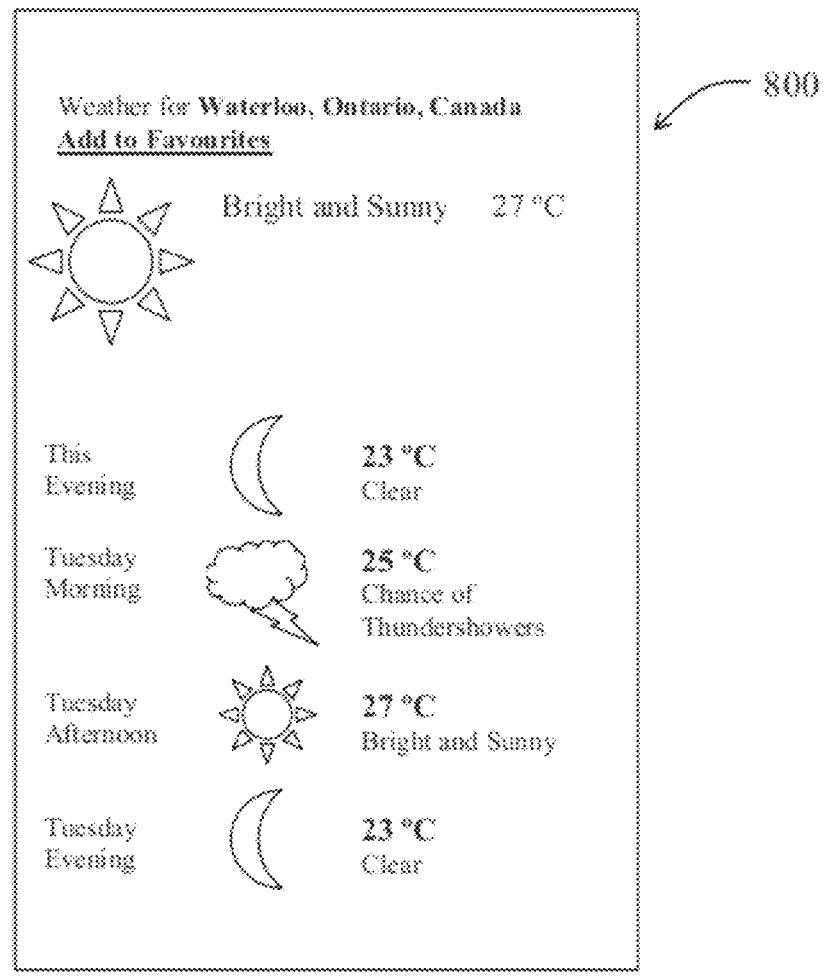
FIG. 2 is an example user interface of a rendered version of a web page based on an example template utilizing example selected content elements retrieve in accordance with an example content extraction document.

Referring to FIG. 2, similar content elements 13 are displayed on an alternate page 800.

Figure 3:
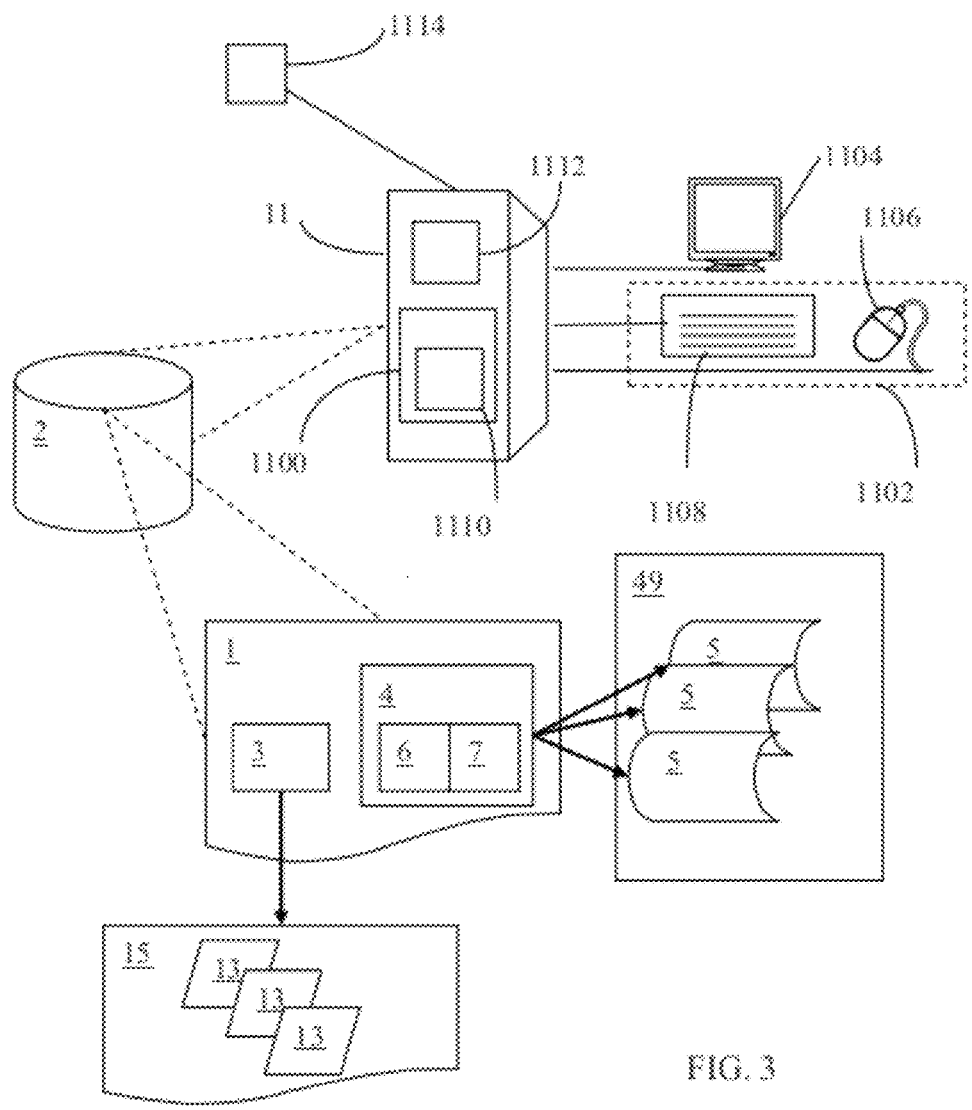
FIG. 3 illustrates an example embodiment of a stored content extraction document used in content extraction by a computer of a structured electronic document to fill data elements with content elements from the structured electronic document.

Referring to FIG. 3, a common expression 3 is stored in a computer readable storage medium 2. A data structure definition 4 is also stored on a computer readable storage medium 2. The common expression 3 identifies one or more content elements 13 in a structured electronic document 15. A structured electronic document is an electronic document structured in accordance with one or more structured definition languages, such as HTML (Hyper Text Markup Language), XML (Extensible Markup Language), or WSDL (Web Service Definition Language). The structured electronic document 15 can, for example, be used to render page 14 (see FIG. 1). The data structure definition 4 defines a data structure 49. The data structure definition 4 is defined according to the common expression 3. The common expression 3 and data definition 4 can be used together to extract content elements 13 from a structured electronic document 15. Extracted content elements can be used, for example, to render a page 800 (see FIG. 2).

A common expression 3 and data structure definition 4 can be utilized to output content of interest to a first structured electronic document 15 from a second structured electronic document 15. The second structured electronic document 15 can, for example, be another instance of the structured electronic document 15 used to form the common expression 3. For example, the structured electronic document 15 from which the common expression 3 is formed can be a weather page for an earlier date, whereas the second structured electronic document 15 can be a weather page created at the time the common expression 3 is to be applied.

It is recognized that the common expression 3 and data structure definition 4 can be stored together on one medium 2, or distributed across different storage media 2. The common expression 3 and data structure definition 4 can be stored in a single file.

The common expression 3 and data structure definition 4 can together form a content extraction document CED 1 to extract content elements 13 from a structured electronic document 15, which CED 1 can be stored in the same file in the storage medium.

For ease of reference, this description will primarily describe a CED 1 embodiment; however, it is understood that the description also applies to distributed embodiments of a common expression 3 and data structure definition 4.

CED 1 stored on a computer-readable medium 2 has a common expression 3 and a data structure definition 4. The data structure definition 4 can include a data element identifying section 6 identifying data elements 5 for the identified content elements 13, and a relationship definition section 7 defining relationships between the identified data elements 5.

An electronic device 11 has processor 1100, input device 1102, and display device 1104. The input device 1102 can include, for example, a pointing device 1106, such as a mouse, track ball, tablet, joystick or other pointing device. As a further non-traditional example, content elements 13 could be highlighted on the rendered document 15 with a unique reference such that the content elements 13 can be selected utilizing a microphone and voice recognition software operating on the electronic device 11. For example, various content elements 13 could be identified by unique references 1, 2, 3 etc. Then the third content element 13 could be chosen by speaking "3" and speaking the unique reference to the microphone. Keyboard 1108 may be similarly used to indicate a particular content element 13. The input device 1102 can also include a keyboard 1108. The keyboard 1108 may act as a pointing device 1106 by highlighting and indicating selection of a content element 13 for example. The processor 1100 may be, for example, any processing device configured to carry out the functions described herein for the device 11. Example processing devices can include a suitably programmed microprocessor, or an appropriately configured application specific integrated circuit (ASIC). The electronic device 11 can be, for example, a personal computer, or other computing device. The electronic device 11 can include memory 1110, typically random access memory (RAM) within the processor 1100 to store any applicable computer programs for execution. Such memory 1110 may be further used to store other components described herein, such as the common expression 3 and the data structure definition 4, and the data structure 49. Alternatively, memory 1112 external to the processor 1110 and internal to the electronic device 11 or memory 1114 externally accessible to the electronic device 11 may be utilized. Computer-readable storage medium 2 can form the memory 1110, 112, or 114. Alternatively, the computer accessible medium 2 can be longer term storage such as a hard drive, CD-ROM disk, or flash memory. It is recognized that some forms of flash memory can be used as both RAM and long term storage.

Figure 4:
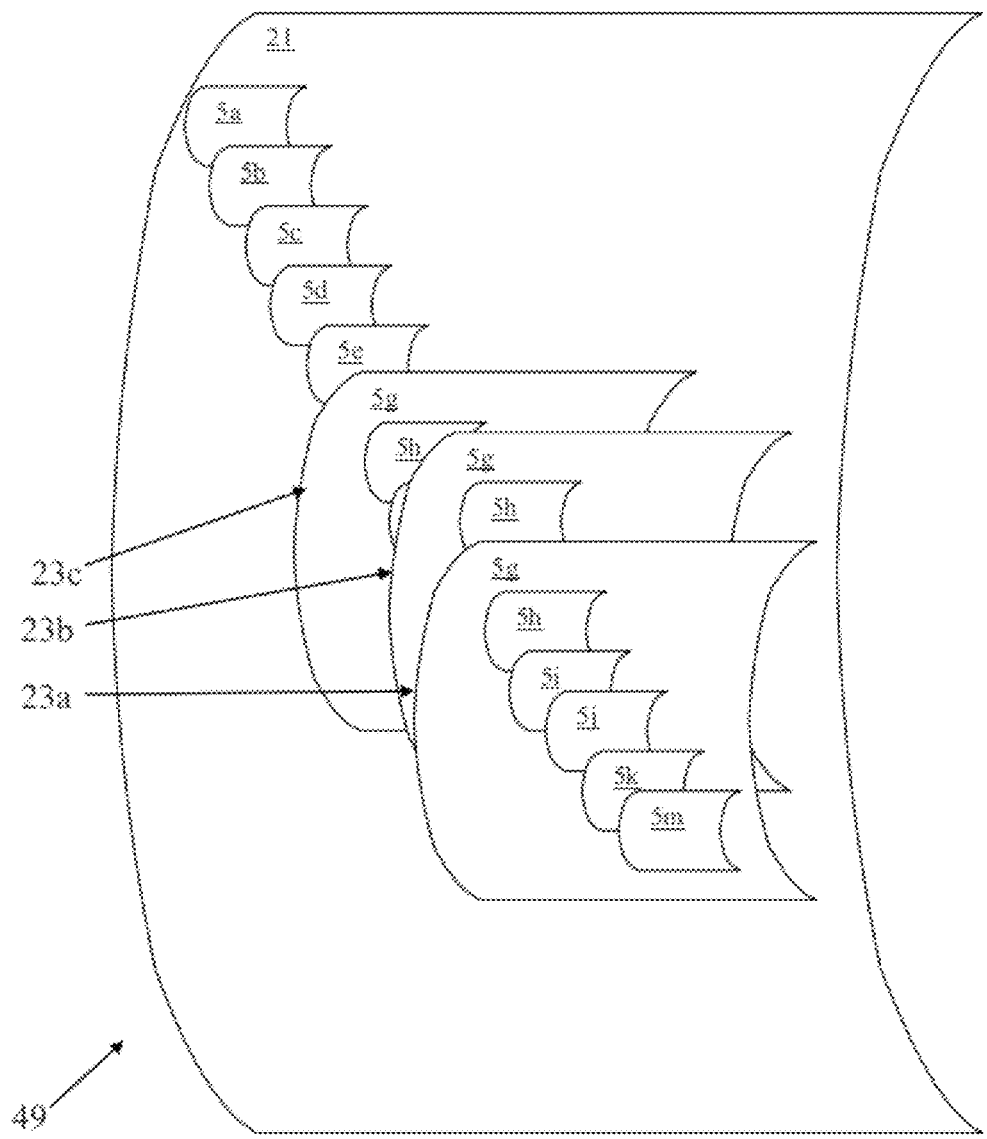
FIG. 4 illustrates an example stored data structure of data elements with relationships defined by an example content extraction document of FIG. 3.

Referring to FIG. 4 as an example related to weather, the CED 1 can identify data elements 5 which correspond to content elements 13. For example, icon 5a representing weather conditions, and alphanumeric weather temperature 5b, conditions 5c, temperature units 5d, and location 5e correspond to respective content elements 13, such as icon 13a, temperature 13b, conditions 13c, temperatureUnits 13d, and location 13e. Further data elements 5 could include a short term weather forecast 5g, and additional weather condition icon 5h, conditions 5i, temperature 5j, day 5k, and time 5m corresponding to icon 13h, conditions 13i, temperature 13j, day 13k and time 13m.

The CED 1 can define a relationship between the identified data elements 5, for example, by grouping them together in a group data element 21, implying a common characteristic between the data elements 5 within the group 21 for example, implying that the icon 5a represents the weather conditions 5c with a temperature 5b for the location 5e with short term weather forecast 5g. A further relationship between the identified data elements 5 can be defined by defining short term weather forecast 5g as containing a further group 23a of icon 5h, conditions 5i, temperature 5j, day 5k, and time 5m, for example, implying that for the short term weather conditions are represented by the icon 5h with temperature 5i on the day 5j at the time 5k. Other aspects of the defined relationship can include, for example, that the short term weather 5g can contain multiple versions 23a, 23b, 23c of the group the version contains. For example, there can be a short term weather collection 23a for a morning time 5k of the given day 5j, a collection 23b for an afternoon time 5k, and a collection 23c for an evening time 5k.

Referring to FIGS. 3, and 4, a data structure 49 can be defined to include data elements 5 that correspond to respective content elements 13 within a structured electronic document 15. The data structure definition 4 can be defined according to the common expression 3 as the common expression 3 identifies respective content elements 13 within a structured electronic document 15. In this description data elements are referred to generically using reference numeral 5. A specific data element may be referred to using reference numeral 5 followed by a letter, for example 5a. The data elements 5 can be stored in the data structure 49. The data structure 49 can include the entirety of the identified data elements 5, 21 and the relationships between the data elements 5.

Referring again to FIG. 3, the sections 3, 6 and 7 have been illustrated as separate sections for ease of comprehension. It is to be understood that the sections 3, 6 and 7 can be merged into one or more sections. Further, functions of the sections can be explicit or implicit, such that identification or definition can be expressly made, or can be implied by other expressions. As an example, defining relationships between elements can impliedly identify those elements. Also, sections can be split into further sections with the functions of section 3, 6 and 7 performed by more than one section. It is understood that each of these alternatives is encompassed within the illustration of the sections as sections 3, 6 and 7 in FIG. 3.

As part of a common expression 3 for an electronic device 11 to identify content elements 13 within a structured electronic document, the CED 1 can identify the location of the structured electronic document 15. For example, the CED 1 can specify a URL (Uniform Resource Locator) for the document 15. Alternatively, the document 15 can be dynamic, such that, an action needs to be carried out at a first structured electronic document (such as a search request page) in order to generate a structured electronic document 15 (such as a search results page). The required action at the first structured electronic document can be defined in the CED 1, along with all necessary inputs to the first structured electronic document. Alternatively, some structured electronic document 15 hosts may allow inputs to be included in a URL to bypass a first structured electronic document.

As part of a common expression for an electronic device 11 to identify content elements 13 within a structured electronic document 15, the CED 1 can identify the locations of the content elements 13 within the structured electronic document 15.

Referring to FIG. 3, in order to identify respective content elements 13 within a structured electronic document 15 a path can be used. A path is made up of a sequence of path parts. Each path part may be considered a step. Within each step is an element and optionally an index if the element is an array element. A path part can also have an identifier that is included after an element name after a number sign or hash ("#") or other suitable separator. A path root is the highest level element from which the steps begin. The highest element can be the leftmost element. In the examples used herein, the steps are separated by a forward slash ("/"). Steps at the same level are herein referred to as corresponding steps. Solutions can be implemented employing other separators.

As an example path, a content element 13 path can be structured as an XPath. For example the path /bookstore/book/title might specify all titles for books on a bookstore page. Where bookstore is a root element and book and intervening element in the structured electronic document 15.

The content elements 13 within the structured electronic document 15 can be identified, for example, using paths based on the XML Path Language (XPath) (http://www.w3.org/TR/xpath), commonly referred to as an XPath. The XML Path Language is a language defined by the World Wide Web Consortium for selecting nodes from an XML document. It is to be recognized that XPath expressions are typically used in queries to return a result set; however, expressions using an XPath syntax are used herein to identify content elements 13 within the structured electronic document 15.

Referring to FIGS. 3 and 4, relationships between the data elements 5 in the data structure 49 can be defined based upon the structure of paths identifying content elements 13 within the structured electronic document 15.

Figure 5:
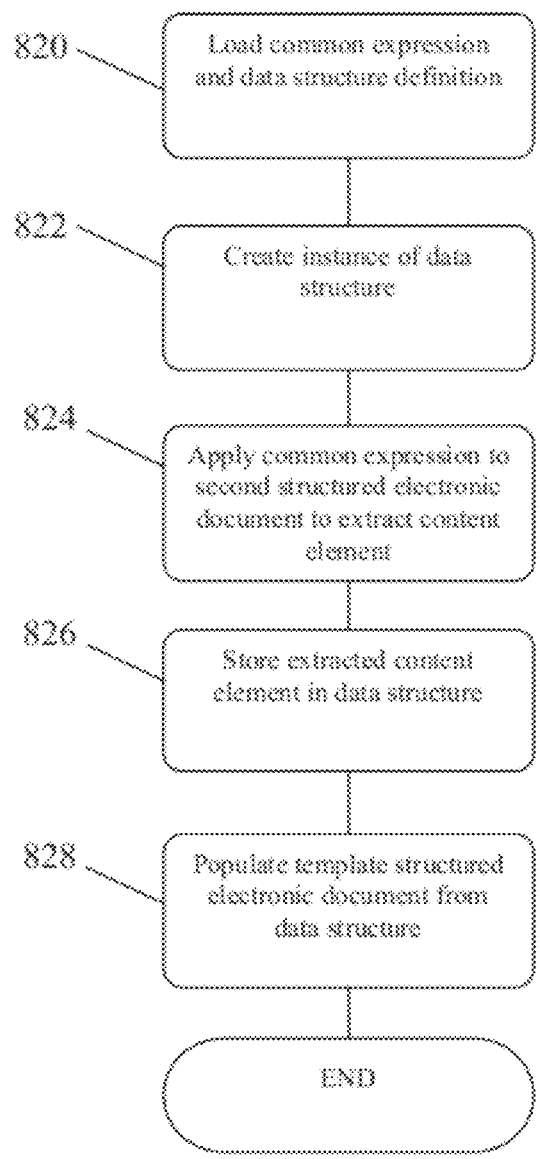
FIG. 5 is an example flowchart of an embodiment of a method to output content of interest of a structured electronic document.

Referring to FIG. 5, to output content from a structured electronic document 15, at 820 common expression 3 and a data structure definition 4 are loaded into memory 1110. The common expression 3 identifies a content element 13 in a first structured electronic document 15. The data structure definition 4 is defined according to the common expression. At 822, a data structure 49 is created in memory 1110 using the data structure definition 4.

At 824, the common expression 3 is applied with a processor 1100 to a second structured electronic document 15 to extract a content element 13 from the second structured electronic document 15.

At 826, the extracted content element 13 is stored in that data structure 49.

At 828, a template structured electronic document 57 (see FIG. 7) is populated using the data structure 49 to produce an output structured electronic document 800 (see FIG. 2).

Figure 6:
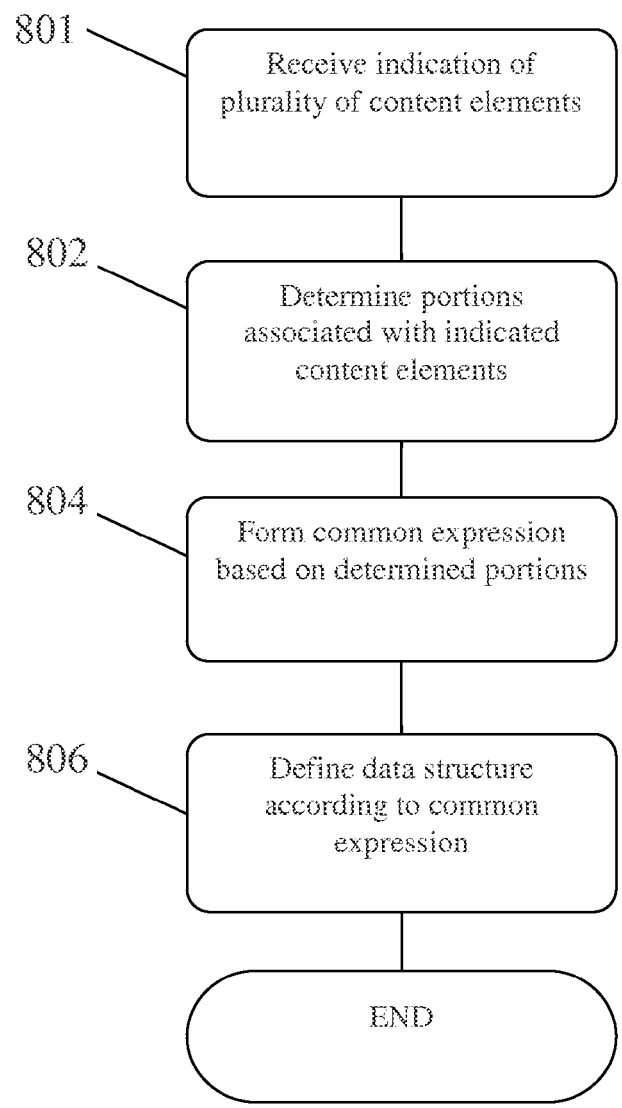
FIG. 6 is an example flowchart of an embodiment of a method to define a data structure based on content of interest from a structured electronic document.

Referring to FIG. 6, at 801, content elements 13 can be indicated by receiving through an input device 1102 an indication of a plurality of content elements 13 within a structured electronic document 15. At 802, the portions can be determined with the processor 1100 from indicated content elements 13. Determined portions can be, for example, individual content elements 13 or arrays of content elements 13.

At 804, the common expression 3 can be formed with processor 1100 based on determined portions of the structured electronic document 15 associated with each content element 13. When the common expression 3 is applied to another structured electronic document 15, another content element is extracted from the other structured electronic document.

At 806, a data structure 49 can be defined according to the common expression 3. The data structure 49 can be further defined by a data structure definition 4 that is defined according to the common expression 3.

Figure 7:
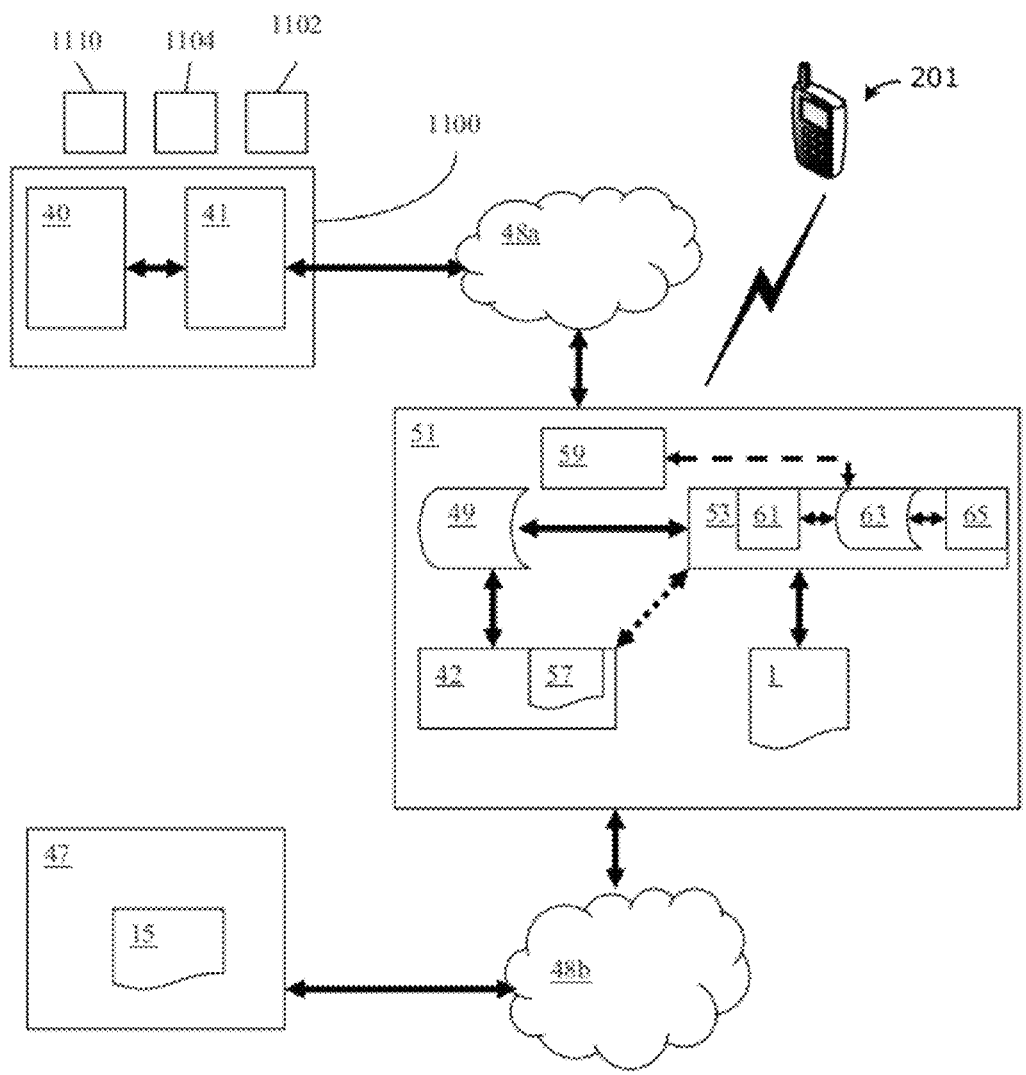
FIG. 7 illustrates an example embodiment with content extraction module in network infrastructure to extract content according to a content extraction document of FIG. 3 to produce a user interface screen for display on a display utilizing a structured electronic document accessible on a remote server through a network.

Referring to FIG. 7, content extraction according to the CED 1 document can be performed by remote server 51 through a content processing module 53 that performs functions similar to the browser extension 41 to carry out the retrieval of the structured electronic document 15, parsing of the CED 1 and the document 15, filling of the data structure 49, and formatting for presentation, with the assistance of presentation tier 42, prior to transmission to the browser 40. Typically the developer portion of the program 39 described earlier will remain as an extension to a browser 40 as the developer will likely be working at an electronic device 11 that is a desktop computer in order to perform development functions. Users of the additional structured electronic documents, as opposed to the developer, can utilize other forms of electronic device 11 without extension 41.

The network infrastructure can be accessible to the electronic device 11 through a public or private network 48a. Similarly, the remote server 47 can be accessible through a public or private network 48b. The networks 48a, 48b can be the same network, and can also be a combination of private and public networks. Content extraction according to the CED 1 at the handheld infrastructure 51 is particularly well suited to use in association with wireless handheld devices as electronic device 11 by reducing quantity of data transmitted to the wireless network device, and off-loading the processing requirements to the remote server 51. It is also to be recognized that the content extraction by a content processing module 53 according to the CED 1 to create and fill a data structure 49 and provide the data structure 49 to presentation tier 42 could occur at the remote server 47 or another remote server or be distributed across remote servers. For example, corresponding CEDs 1 could be stored at the remote server 47 for the markup documents 15 stored at the remote server 47; so that, a website provider can provide parallel websites for different browser configurations, such as one using the structured electronic documents 15 for an electronic device 11 that is a desktop computer and another providing handheld browser optimized user interface screens using a CED 1.

A listener 59 in the remote server 51 can listen for a request to perform content extraction according to CED 1 or presentation template 57. If such a request is received, the listener 59 can begin the initiation process for the template 57 or CED 1. For example, a request might be inferred by the listener 59 where a CED 1 or presentation template 57 is associated with a particular URL requested by a browser 40. For example, the listener 59 can listen for a request on an HTTP over TCP/IP (HyperText Transport Protocol over Transmission Control Protocol/Internet Protocol) transport layer. The listener 59 may also listen on other transport protocols.

The remote server 51 may also allow the initiation of content processing according to the CED 1 by a user and presentation of the content elements 13 to a user through transport protocols other than HTTP (HyperText Transport Protocol), such as email (SMTP) or other messaging protocols such as SMS (Short Message Service). A combination of transport protocols can be used, for example initiation by HTTP and presentation by SMTP. Automatic initiation of a CED 1 is also possible. For example, a CED 1 can be initiated automatically once per day to send out a weather report by email.

By default, content elements 13 may be transmitted to the address from which the request is received. As part of the registration of a CED 1, a remote server can also receive user choices for desired protocols on which to listen for requests and on which to transmit content elements. For example, an email address can be associated with the CED 1 such that the content elements 13 are transmitted to the email address after content extraction according to the CED 1.

The content processing module 53 can include a markup language parser 65 (typically an HTML parser for parsing HTML for most documents 15) and a content extraction engine 61. First the parser 65 parses the received structured electronic document 15 and generates a DOM (document object model) 63. The DOM 63 may be represented in many ways as is known to those of skill in the art. In this description the DOM 63 will be graphically represented as a tree structure. The DOM 63 is processed by the content extraction engine 61. The content extraction engine 61 processes the DOM 63 according to the CED 1 to create a data structure 49 in accordance with the data structure 49 definition in the CED 1. The content extraction engine 61 then populates the data structure 49 with the associated content elements 13 identified in the CED 1. The content extraction engine 61 traverses the paths of the DOM 63 specified in the CED 1 to find the specified content elements 13. The content extraction engine 61 then populates the data structure 49 with the content elements 15 in accordance with the associations in the CED 1.

Relationships between data elements can be defined by defining the data structure 49 for the elements. A data structure definition 4 can include a path wherein a separator between data elements 5 indicates that a data element 5 to the right of the separator is nested within a data element 5 to the left of the separator, and wherein an array representation indicates that a data element to the left of the array representation contains an array of data elements. For example, a data structure 49 can have paths such as: responseElement. ShortTermDay [x].temperature. Elements are separated by a "." (dot). A "." (dot) indicates that the element to the right is nested within the element to the left and "[x]" indicates that the element to the left has an array of elements. For example, shortTermDay has an array of ShortTermDay elements, one array record for different times of a day (for example, morning, afternoon, evening). A rResponseElement is a top-level container data element of the data structure 49. The responseElement contains the other data elements.

Relationships between data elements can be defined through the use of XML schema. Data elements can be defined within an XML schema. Using XML schema, data elements can be combined into arrays and complex types. Additionally, data types can be defined for data elements.

As an example, structured electronic document 15 can contain hypertext markup language (HTML) content containing HTML content elements 13. HTML content can be utilized from, for example, a web page by treating the HTML as a data source. Other markup language formats can be used, such as, for example, the XML, Extensible Hypertext markup Language (XHTML) and others.

The Web Services Definition Language (WSDL) can be used as the basis format for a CED 1. Although WSDL was originally created for web services, WSDL is extensible and can be used for other purposes. WSDL is suited for use with a CED 1 as WSDL allows the definition of a service to obtain a structural electronic document 15, is extensible to incorporate the use of other structured definition languages. WSDL is a standard, and there are various WSDL processing tools available.

A WSDL CED 1 can be made up of a plurality of sections. Examples of these sections will now be described for an example CED 1 used with reference to a structured electronic document which displays on a browser page 14 of a display 1104 as shown in FIG. 1 in response to a request for weather information for Waterloo, Ontario.

A WSDL types section contains an XML Schema (XS) that defines relationships between data elements using complex types. Continuing with the weather example of FIG. 1, an example WSDL types section with XML schema relating various named data elements to a top level responseElement data element to define a data structure 49 (providing a data structure definition 4) can include:

```
<wsdl:types>
  <xs:schema targetNamespace="test.net.rim" elementFormDefault="qualified">
    <xs:element name="responseElement">
      <xs:complexType>
        <xs:sequence>
          <xs:element name="icon" type="xs:string"/>
          <xs:element name="temperature" type="xs:string"/>
          <xs:element name="conditions" type="xs:string"/>
          <xs:element name="temperatureUnits" type="xs:string"/>
          <xs:element name="location" type="xs:string"/>
          <xs:element name="shortTermDay" maxOccurs="unbounded">
            <xs:complexType>
              <xs:sequence>
                <xs:element name="icon" type="xs:string"/>
                <xs:element name="conditions" type="xs:string"/>
                <xs:element name="day" type="xs:string"/>
                <xs:element name="time" type="xs:string"/>
              </xs:sequence>
            </xs:complexType>
          </xs:element>
        </xs:sequence>
      </xs:complexType>
    </xs:element>
  </xs:schema>
</wsdl:types>.
```

Referring to FIGS. 4 and 1, the data structure 49 responseElement defined in the XML schema includes a collection of elements, such as icon 5*a*, temperature 5*b*, conditions 5*c*, temperatureUnits 5*d*, and location 5*e*, which correspond in FIG. 1 to the respective content elements 13, such as icon 13*a*, temperature 13*b*, conditions 13*c*, temperatureUnits 13*d*, and location 13e. The responseElement also defines a ShortTermDay data element 5g that is a group that includes a further collection of elements, such as icon 5h, conditions 5i, temperature 5j, day 5k and time 5m, corresponding to the icon 13h, conditions 13i, temperature 13j, day 13k and time 13m elements in FIG. 1.

A common expression 3 to identify content elements 13 within a structural electronic document 15 is provided in the remainder of the WSDL.

A WSDL message definition section defines an input message named "Search Request" and an output message named "Search Response". The SearchRequest message contains the marked form elements as parts, and the SearchResponse message contains the responseElement data structure 49 as a part. Continuing with the weather example of FIGS. 4 and 1, an example WSDL message section can include:

```
<wsdl:message name="SearchRequest">
    <wsdl:part name="requestElement">
</wsdl:message>
<wsdl:message name="SearchResponse">
    <wsdl:part name="responseElement"
element="impl:responseElement"/>
</wsdl:message>.
```

A WSDL Port Types section defines a port type (SearchInterface) with an operation (Search) to be carried out using the input messages and the output messages. Continuing with the weather example of FIGS. 4 and 1, an example WSDL Port Type section can include:

```
<wsdl:portType name="SearchInterface">
   <wsdl:operation name="Search">
      <wsdl:input message="impl:SearchRequest"/>
      <wsdl:output message="impl:SearchResponse"/>
   </wsdl:operation>
</wsdl:portType>.
```

A WSDL Binding section defines a binding (Binding) of the port types (Search Interface) with the operation (Search) and the input messages (SearchRequest) and the output messages (SearchResponse). Also associated with the binding is an HTML binding (an extension element) of content elements 13 paths to the respective data element 15 of the data structure 49 response element. The bindings provide an association between the data elements 5 in the data structure 49 and the content elements 13 in the document 15. Continuing with the weather example of FIGS. 4 and 1, an example WSDL Binding section can include:

```
<wsdl:binding name="Binding" type="impl:SearchInterface">
  <wsdlsoap:binding style="document"
transport="http://schemas.xmlsoap.org/soap/http"/>
   <wsdl:operation name="Search">
    <wsdl:input name="SearchRequest">
      <wsdlsoap:body use="literal"/>
    </wsdl:input>
    <wsdl:output name="SearchResponse">
      <wsdlsoap:body use="literal"/>
      <html:htmlBinding>
       <html:nodeBinding
htmlPath="/div#outer_wrapper/div#content_wrapper/div#pagetitle/
div#submasthead/H1/text[1]" bindingPath="responseElement.location"/>
       <html:nodeBinding
htmlPath="/div#outer_wrapper/div#content_wrapper/div#obs/
div#obs_conds_wrap/div#obs_conds/img/src"
bindingPath="responseElement.icon"/>
       <html:nodeBinding
htmlPath="/div#outer_wrapper/div#content_wrapper/div#obs/
div#obs_conds_wrap/div#obs_conds/div#obs_currtemp/div/text[1]"
bindingPath="responseElement.temperature"/>
       <html:nodeBinding
htmlPath="/div#outer_wrapper/div#content_wrapper/div#obs/
div#obs_conds_wrap/div#obs_conds/div#obs_currtemp/div/text[3]"
bindingPath="responseElement.temperatureUnits"/>
       <html:nodeBinding
htmlPath="/div#outer_wrapper/div#content_wrapper/div#obs/
div#obs_conds_wrap/div#obs_conds/div#obs_currtemp/text[2]"
bindingPath="responseElement.conditions"/>
       <html:nodeBinding
htmlPath="/div#outer_wrapper/div#content_wrapper/ul#precip_data/
li#rain/text" bindingPath="responseElement.rain"/>
       <html:nodeBinding
htmlPath="/div#outer_wrapper/div#content_wrapper/ul#precip_data/
li#rain/li#snow/text" bindingPath="responseElement.snow"/>
       <html:nodeBinding
htmlPath="/div#outer_wrapper/div#content_wrapper/div#stermfx/table/tr
[0]/td[x]/img/src"
bindingPath="responseElement.shortTermDay[x].icon"/>
       <html:nodeBinding
htmlPath="/div#outer_wrapper/div#content_wrapper/div#stermfx/table/tr
[1]/td[x]/text"
bindingPath="responseElement.shortTermDay[x].conditions"/>
       <html:nodeBinding
htmlPath="/div#outer_wrapper/div#content_wrapper/div#stermfx/table/tr
[2]/td[x]/text"
bindingPath="responseElement.shortTermDay[x].temperature"/>
       <html:nodeBinding
htmlPath="/div#outer_wrapper/div#content_wrapper/div#stermfx/table/t
head/tr/th[x]/text"
bindingPath="responseElement.shortTermDay[x].day"/>
       <html:nodeBinding
htmlPath="/div#outer_wrapper/div#content_wrapper/div#stermfx/table/t
head/tr/th[x]/text[1]"
bindingPath="responseElement.shortTermDay[x].time"/>
      </html:htmlBinding>
    </wsdl:output>
  </wsdl:operation>
</wsdl:binding>.
```

With the operation defined in the binding section, a binding fills in information about the inputs, adding in the HTTP Method of the form (either GET or POST) through proprietary tags.

Binding paths represent a hierarchy in which the output node (data element 5) is stored within the WSDL binding. Binding paths map HTML paths (content element 13 path) to internal names, which can look like: responseElement.ShortTermDay[x].temperature. Again, a "." (dot) indicates that the item to the right is nested within the item to the left and "[x]" (an x within square brackets) indicates that the output node contains an array of elements.

Lastly, a service is defined which associates the binding with a port. Within the port, the address is set to the action attribute of the marked input form, or if no input form was marked, it is set to the URL of the output page.

A WSDL Service section defines a service (Service) and a port (Port) for the service. A specific resource for obtaining the structured electronic document is associated with the Port by listing an HTML reference within the WSDL Port definition. Continuing with the weather example of FIGS. 4 and 1, an example WSDL Service section can include:

```
<wsdl:service name="Service">
    <wsdl:port name="Port" binding="impl:Binding">
        <html:address location="(www.example.com)"/>
    </wsdl:port>
</wsdl:service>
```
, where "www.example.com" is the url of the structured electronic document 15 or an input form required to obtain the structured electronic document 15. Necessary inputs, such as, for example, the desired location for the weather can be specified as part of the URL if accepted by the host in order to bypass an input form.

It is to be noted that throughout the above examples the expression "html:" is a reference to a non-WSDL element that is not part of the WSDL standard. XML Schema references are non-WSDL elements that are part of the WSDL standard. Namespaces for these can be referenced at the outset of the CED 1 so that the WSDL parser will know what action to take.

In order to extract content according to a CED 1 in the WSDL format with "html:" and "xml" references, a WSDL parser could initially generate a WSDL structure, including the data structure 49 from the XML references. The structured electronic document 15 can be retrieved and passed to an HTML parser 65 to create an HTML DOM (document object model) 63. The DOM 63 can then be processed in accordance with the paths specified in the binding to obtain the content elements 13 specified by the paths. The content elements 13 can then be used to fill the data structure 49 specified in the WSDL structure in accordance with the bindings.

In order to recognize path structure to obtain content elements 13 appropriate computer-readable instructions can be executed to process the paths to obtain the content elements and to fill the data structure in accordance with the bindings. The instructions will depend on the specific implementation of the path language chosen and the environment within which the instructions are to be run. For example, the instructions could be provided as a separate program from the HTML parser. As an alternative, the instructions, or a portion thereof, for path parsing can be incorporated into the HTML parser 65 such that the resulting HTML DOM 63 is expressed only in terms of the specified path language. This can result in a much smaller HTML DOM that can be processed more quickly to find the content elements 13 to populate the WSDL structure.

The generation of such computer-readable instructions will be within the skill of a person skilled in art utilizing their common general knowledge and the information contained in this disclosure.

After the data structure 49 is filled it can then be used in conjunction with various presentation tiers, including associated presentation templates 57 for the structured electronic document 15. The templates can be associated to the data structure 49 by the URL of the presentation template 57. Example presentation tiers 42 and presentation template 57 include those used, for example, in association with JavaServer Pages (JSP) and Java Server Faces (JSF). JavaServer, JavaServer Pages and JavaServer Faces are trademarks of Sun Microsystems.

Although reference is made herein to examples utilizing HTML, the principles described herein are not limited to HTML. Also, the WSDL examples are similarly not limited to WSDL. Embodiments include the use of any computer-readable markup language. HTML has been used as an example as many computer-readable structured electronic documents utilize some form of HTML.

An example tool implemented for example as an extension 41 to a browser 40, or independently therefrom, will be described. The tool provides automated generation of a CED 1 based upon user selection of content elements 13 from a rendered structured electronic document 15.

The tool provides visual content element selection, pattern recognition for array path conversion and path merging, grouping, and automated generation from identified content elements 13 of a data structure definition 4 with associated identification of content elements 13 within a structured electronic document 15. The data structure definition 4 with associated identification of content elements 13 are embodied within a WSDL document; however, it is to be recognized that the definition 4 and associated identification could be embodied in other formats, such as a data structure 49 with associated identification of content elements 13 that are used to populate the data structure 49. In this case, the data structure 49 defines a copy of itself.

Figure 8:
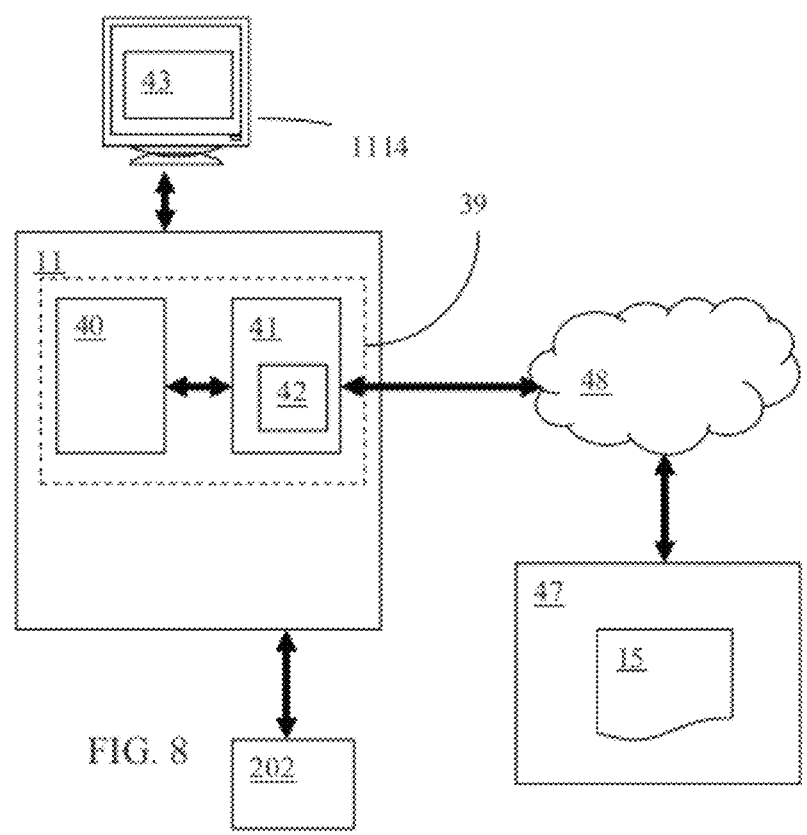
FIG. 8 illustrates an example browser with extensions running on a computer for content extraction according to a content extraction document of FIG. 3 to produce a user interface screen for display on a display utilizing a structured electronic document accessible on a remote server through a network.

Referring to FIGS. 3 and 8, the electronic device 11 can extract content according to the CED 1 to obtain content elements 13 from the structured electronic document 15. The common expression 3 and data structure definition 4 can be loaded into memory 1110, 1112, or 1114. An instance of the data structure 49 defined by the data structure definition 4 can be created in memory 1110, 1112, or 1114. The processor 1100 can apply the common expression 3 to a structured electronic document 15 to extract one or more identified content elements 13 from the structured electronic document 15 to extract one or more identified content elements 13 from the structured electronic document 15. Each extracted content element 13 is stored in the instance of the data structure 49. A template structured electronic document 57 (see FIG. 7 and related description) can be populated from the instance of the data structure 49 to produce an output structured electronic document, such as described herein with regard to structured electronic document 800 (see FIG. 2).

The electronic device 11 can make the content elements 13 available to a presentation tier 42 for formatting for display as part of a user interface screen 43 on a display 1104 of an electronic device 11, for example, executing a computer program 39 on the processor 1100. The computer program 39 can be for example a browser 40 with an extension 41 sometimes referred to as a plug-in or add-in the browser 40. There are many well known, commercially available software programs, commonly referred to as browsers, which can be executed on the electronic device 11 as the browser 40. In FIG. 8 the document 15 is shown as accessible on a remote server 47 through a network 48. The network 48 may be a public network, such as the Internet, or a private network, such as an intranet. The remote server 47 is an originating server as the structured electronic document 15 originates for the remote server 51 based on CED 1 from the remote server 47. The computer programs described herein, such as program 39, 40, 41, together with a computer-readable medium, such as memory 1110, in which the program is stored can be a computer program product.

General techniques for generating an extension to a browser 40 are well-known. Specific extensions 41 for use in association with a CED 1 will be within the skill of those skilled in the art based upon such general techniques, their common general knowledge, and the information contained herein. In the case of a wireless device browser 40, limits such as screen size and bandwidth can be alleviated by displaying content rearranged or reduced in accordance with the CED 1 to the user. Rearrangement or reduction to take into account the limitations of a particular device 11, 101 is often referred to as optimization.

In extracting content according to the CED 1 the browser 40 with extension 41 parses the CED 1 in order to identify the data elements 5, to determine the relationships between the data elements 5, to identify a respective content element 13 within a structured electronic document 15 for each identified data element 5, and to extract the content elements 13. The CED 1 can be structured such that publicly available parsers can be used for this purpose. As is discussed herein, the CED 1 can be structured in accordance with publicly available languages in order to allow the extension 41 to use publicly available parsers where possible. The extension 41 can be provided with custom instructions for interpreting the CED 1 for specific applications as required.

After retrieving the content elements 13, the browser 40 with extension 41 can fill the data elements 5 with the extracted content elements 13. Referring again to FIG. 4, if desired, the data elements 5 can be stored in a data structure 49, including the entirety of the identified data elements 5, 21 and the relationships between the data elements 5. The data structure 49 can then be made available to the presentation tier 42. The content elements 13 are thus being made available to the presentation tier 42 through the data structure 49. The extension 41 can utilize browser 40 features to carry out some functions of the extension 41, for example, through application programming interface (API) calls from the extension 41 to the browser 40. The extension 41 is a content extraction module similar to the content extraction module 53 discussed below.

The methods described herein are particularly well suited to wireless networks. Accordingly, embodiments will be further described with reference to remote server 51 as network infrastructure of a wireless service provider in place of remote server 51. Although embodiments are described herein with reference to the remote server 51 as network infrastructure it is to be recognized that other remote servers 51, not forming part of a network infrastructure could be used to carry out the methods described herein. It is also recognized that the term "remote server" is to be broadly interpreted and may, for example, include distributed systems that distribute the functions of the remote server 51 among more than one server. The remote server 51 will include one or more processors, which can be similar to processor 1100, and associated memory, which can be similar to memory 1110, to store and execute the computer programs and instructions discussed herein.

Figure 9:
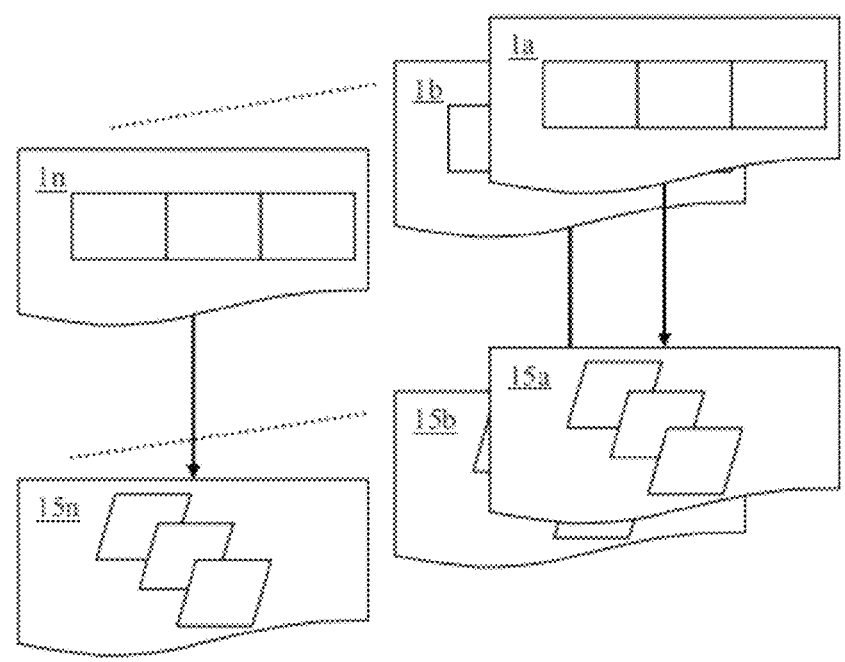
FIG. 9 illustrates multiple content extraction documents for multiple structured electronic documents.

Referring to FIG. 9, multiple CEDs 1a, 1b . . . 1n can be stored for use in association with multiple structured electronic documents 15a, 15b . . . 15n.

Figure 10:
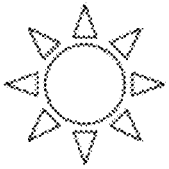
FIG. 10 is an example user interface screen for selecting elements for grouping.

Referring to FIG. 10, in order to identify content elements 13 on a structured electronic document 15 for grouping, a user may select the content elements 13 on a user interface screen 200 where the structured electronic document 15 has been rendered to a display 1104. Selection may be performed, for example, by using a mouse or keyboard or other user input device 1102 (see FIG. 3). Example embodiments of techniques for content element 13 selection are further described with respect to a tool embodiment later in this description.

Figure 11:
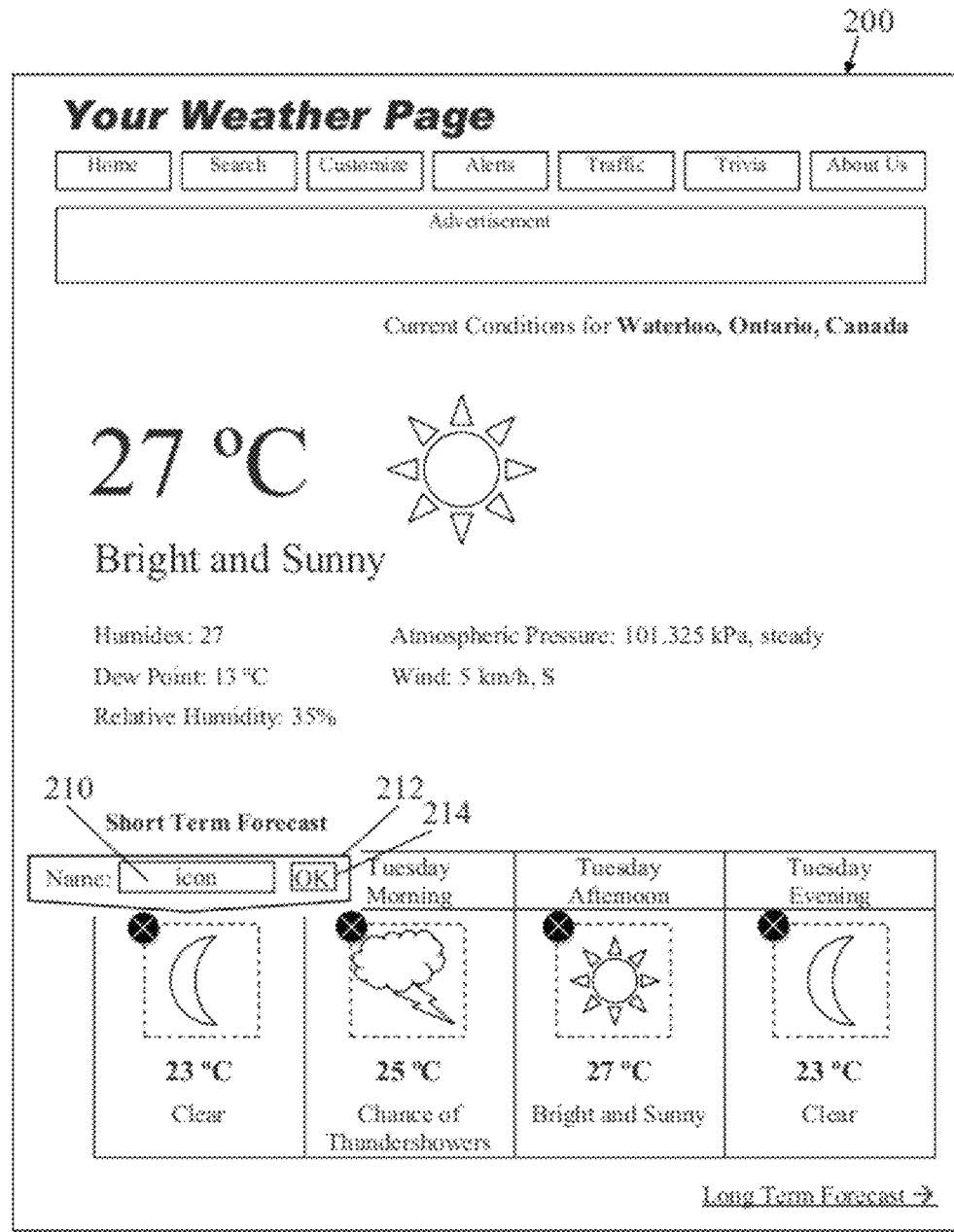
FIG. 11 is an example user interface screen with pop-up window for group naming.
Figure 12:
FIG. 12 is an example user interface screen with pop-up window for naming elements.

A computer program running on electronic device 11, for example, an extension of a browser 40, contains computer-readable instructions stored on a computer-readable medium accessible to the electronic device 11 for execution on the electronic device 11 to associate the selected content elements 13 with their respective content paths. Extensions are also sometimes referred to as add-ins, add-ons, or plug-ins. Visual feedback of user selection of a content element 13 can be provided, for example, by highlighting the rendered content element 13 on the screen 200, such as shown by the graphical outlines of rendered content elements 13a, 13b, 13c, 13d, 13g, 13h, 13i, 13j. As shown in FIG. 10, FIG. 11 and FIG. 12, the graphical outline can include a cancel indicator 203, for example an encircled "x" the selection of which deselects the associate element of content 13.

Browser extensions 41 can have access to a DOM structure 63 (FIG. 7) of a structured electronic document 15, and can utilize various browser 40 features. For example, extensions 41 to a browser 40 distributed by Mozilla under the trademark Firefox and available at www.mozilla.com can be written using XUL (XML User Interface Language) and JavaScript languages. Similarly, the browser 40 could be a browser distributed by Microsoft Corporation under the trademark Internet Explorer. JavaScript is a trademark of Sun Microsystems. Other browsers 40 may be used.

At the time of selection of a group, a user can input a name for the group. For example, the name can be input into a text box in a pop-up window in a similar manner to pattern naming described herein with respect to FIG. 11. The name can then be incorporated by the computer program into the data structure definition 49 as the name of the group array element. This can simplify use of the data structure 49, as opposed to, for example, allowing the computer program to generate group names such as group1, group2, etc. Techniques for naming of element, for example, groups, arrays, and other elements are discussed herein. It is to be recognized that other techniques for naming elements will be evident to those skilled in the art and can be used in place of the described techniques.

In order to allow more efficient selection of elements for grouping, the computer program 41 can highlight on the user interface screen 200 previously grouped content elements 13 for which content element 13 grouping has previously been performed.

In order to identify groups, content element 13 paths can be in a form that contains whole array elements. Methods of identifying content elements 13 by paths are discussed herein. In addition, methods of identifying elements within content elements 13 paths that can be represented as whole array elements are discussed herein. The computer program 41 can incorporate computer-readable instructions to carry out such methods to first express content element 13 paths in an array element form with array element.

In order to allow more efficient selection of elements for grouping, the computer program 41 can highlight on the user interface screen 200 content elements 13 paths that have been previously expressed in an array element form as shown by the differently highlighted elements 13g, 13h, 13i, 13j in FIG. 10, the highlighting being outlining in this example. Pattern recognition for Identification of content elements 13 for array representation, and merger of array representation are discussed below.

Referring to FIG. 12, individual rendered content elements 13 can be named in a similar manner to groups using input text box 220 and pop-up window 222. These names can be used to name the data elements 5 of the data structure 49.

Data structure definitions 4 for grouped data structures 49 can be utilized in, for example, a computer-readable content extraction document (CED) 1 for further use by a computer program executing on the electronic device 11, such as browser 40 with extensions 41 to create an instance of the data structure 49 in memory in accordance with the CED 1 and fill the data elements 5 with corresponding content elements 13, and to utilize the filled data structure 49, for example, in a presentation tier 42 as discussed herein. It is recognized that the filled data structure 49 could be used for other purposes, for example, automatic filling of web forms, generation of word processing documents from templates, or the population of a database for later use. Many other uses will be evident to those skilled in the art based upon the principles described herein.

Grouping as discussed above allows grouping of separate data elements 5 into complex types/structures 49. Grouping can improve the efficiency and usability of the data structure 49.

Figure 13:
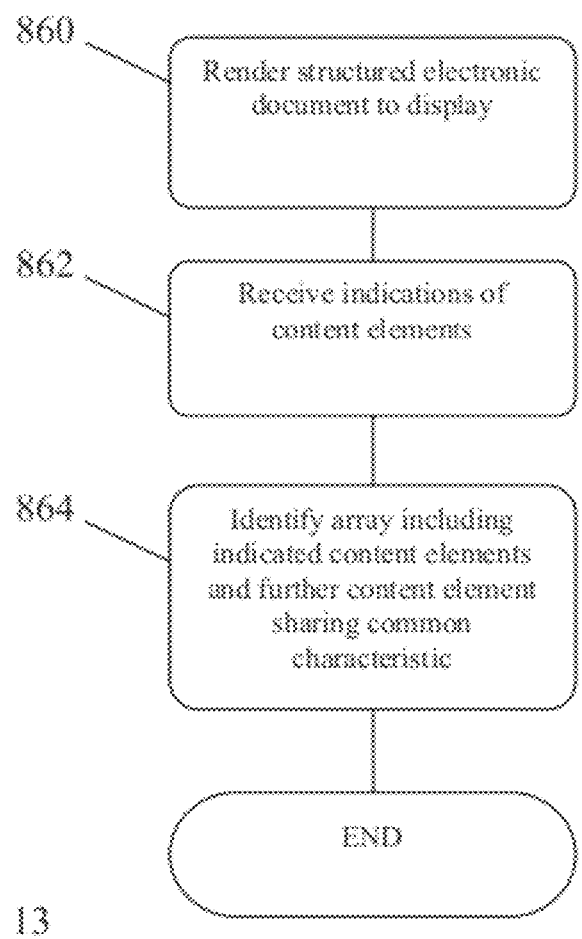
FIG. 13 is an example flowchart of an embodiment of a method to identify content of interest of a structured electronic document.

Referring to FIG. 13, a method is shown to identify content of interest in a structured electronic document 15, such that, for example, the content can be used to form a common expression 3.

At 860, a structured electronic document 15 is rendered to a display device 1104.

At 862, at least two separate indications of content elements 13 within the structured electronic document 15 are received through the input device 1102.

At 864, an array of related content elements 13 within the rendered structured electronic document 15 are identified with the processor 1100. The array of related content elements 13 include the indicated content elements 13 and a further content element 13 within the structured electronic document 15. The further content element 13 is identified as sharing a common characteristic with the indicated content elements 13.

Figure 14:
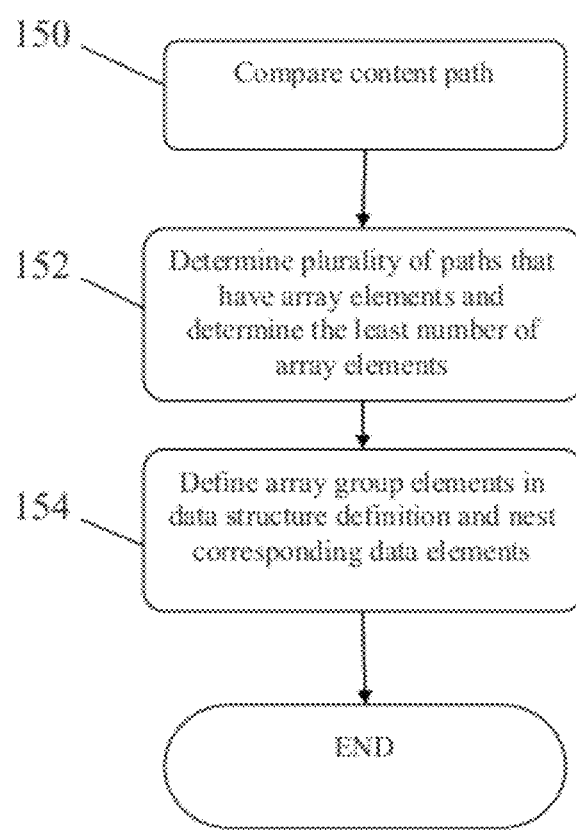
FIG. 14 is an example flowchart of an embodiment of a method to carry out element grouping.

With reference to FIG. 14, a method of processing paths that identify content elements 13 within the structured electronic document 15 to define a data structured definition 4, including relationship definitions, according to a common expression 3 can involve at 150 comparing a plurality of content paths, wherein each content path identifies a respective content element 13 in a structured electronic document 15. At 152, the method can further involve determining if there is a plurality of content paths that have whole array elements and determine the least number of array elements in the paths. At 154, in a data structure definition 4 with data elements 5 corresponding to the content elements 13 identified by the content paths, and for each whole array element in the determined content path, the method can further include defining an array group element in the data structure definition 4 and nesting the corresponding data elements 5 under the array group element. A whole array element represents all elements of an array, for example, T[X] is an entire array representing all individual elements T[1], T[2], etc. of the array T where X is a variable index. Grouping can bring together otherwise disconnected elements under a common parent complex element.

For example, three paths identifying content elements 13, such as a weather icon, text describing weather conditions, and text indicating temperature can be as follows:

/div#outer_wrapper/div#content_wrapper/div#stermfx/table/tr[0]/td[x]/img/src
/div#outer_wrapper/div#content_wrapper/div#stermfx/table/tr[1]/td[x]/text
/div#outer_wrapper/div#content_wrapper/div#stermfx/table/tr[2]/td[x]/text where td[x] is an array element, in this case an HTML table indicated to be an array. A rendered example of a structured electronic document 15 having the above paths might appear as elements 13h, 13i, 13j, shown in FIG. 1 and discussed herein.

Without grouping as discussed in the method above, a data structure 49 might define relationships between data elements 5 corresponding to the content elements 13 such that each data element 5 is a separate array element 5 (for example: icon[x], conditions[x], temperature[x] extending from a root element (responseElement) of the data structure 49), such that the data structure has data element paths:

responseElement.icon[x]
responseElement.conditions[x]
responseElement.temperature[x].

In this case "icon [x]" is an array of weather icons, "conditions [x]" is an array of weather conditions, and index for "temperature [x]" is an array of temperatures.

As discussed previously a data element 5 is an element of the data structure 49 whereas a content element 13 is a content element 13 of the structured electronic document 15.

After grouping, a group array element (shortTermDay[x]) is inserted into the data structure 49 and the whole array data elements 5 are converted to individual data item elements 5 such that the individual data elements 5 no longer represent whole arrays (e.g. icon [x] becomes icon) with the result that:

responseElement.shortTermDay[x].icon
responseElement.shortTermDay[x].conditions
responseElement.shortTermDay[x].temperature It is to be recognized that the grouping method can be performed on more complex content elements 13 paths such that group array elements may be nested within group array elements.

For example, without grouping as discussed in the method above, a data structure 49 might be defined as follows (with the initial content element 13 path on the left of the operator "=>" and the resulting data structure 49 path on the right):

table/tr[x]/td[0]/text=> responseElement.bookTitle[x]
table/tr[x]/td[1]/table/tr[y]/td[0]/text=>
responseElement.label0[x].authorFirstName[y]
table/tr[x]/td[1]/table/tr[y]/td[1]/text=>
responseElement.label1[x].authorLastName[y]
table/tr[x]/td[1]/table/tr[y]/td[2]/text=>
responseElement.label2[x].authorRating[y].

After grouping, a second group array element (author[y]) is nested within a first group array element (book[x]):

table/tr[x]/td[0]/text=> responseElement.book[x].bookTitle
table/tr[x]/td[1]/table/tr[y]/td[0]/text=>
responseElement.book[x].author[y].authorFirstName
table/tr[x]/td[1]/table/tr[y]/td[1]/text=>
responseElement.book[x].author[y].authorLastName
table/tr[x]/td[1]/table/tr[y]/td[2]/text=>
responseElement.book[x].author[y].authorRating.

Figure 15:
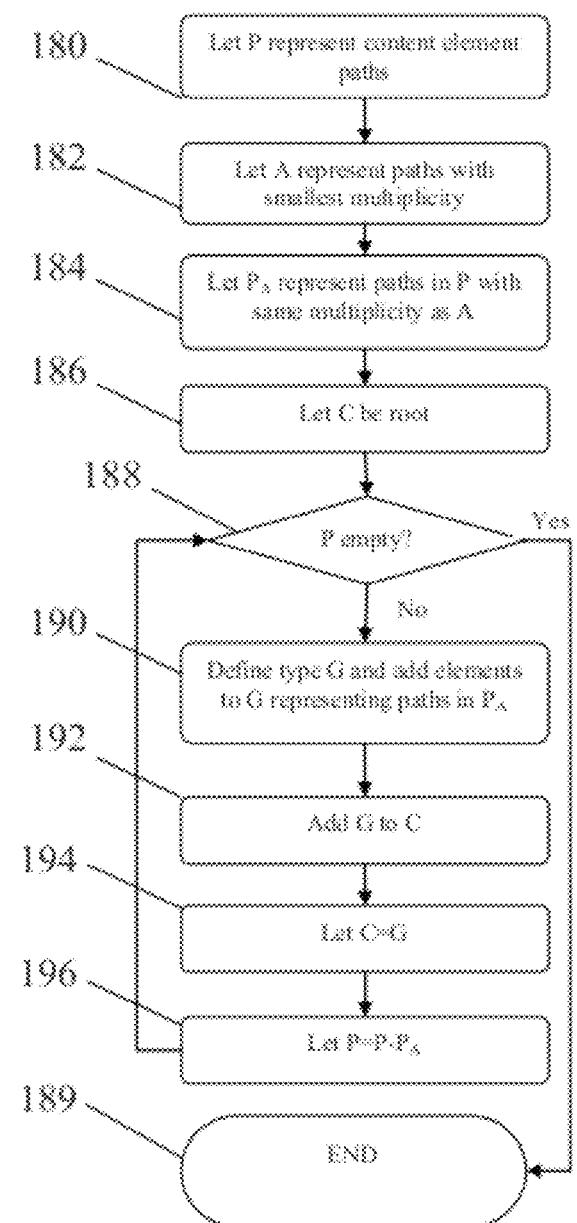
FIG. 15 is a further example flowchart of an embodiment of a method to carry out element grouping.

Referring to FIG. 15, as a further embodiment of a method to create a data structure definition 4 defining a data structure 49, at 180, let P represent the set of content element paths selected for grouping. At 182, let A represent the path with the smallest multiplicity (i.e. number of variable indices, for example "x", "y" in the path shown above). At 184, let $P_A$ represent the paths in P with the same multiplicity as A. At 186, let C be a root complex type element (e.g. responseElement) for data structure 49.

At 188, if P is empty, do nothing and exit at 189.

At 190, define a complex type G and the elements represented by the paths in $P_A$ are added as elements of complex type G.

At 192, add G as a field of C.

At 194, let C=G.

At 196, let $P=P-P_A$.

Return to checking at 188 if P is empty and continue from there.

Figure 16:
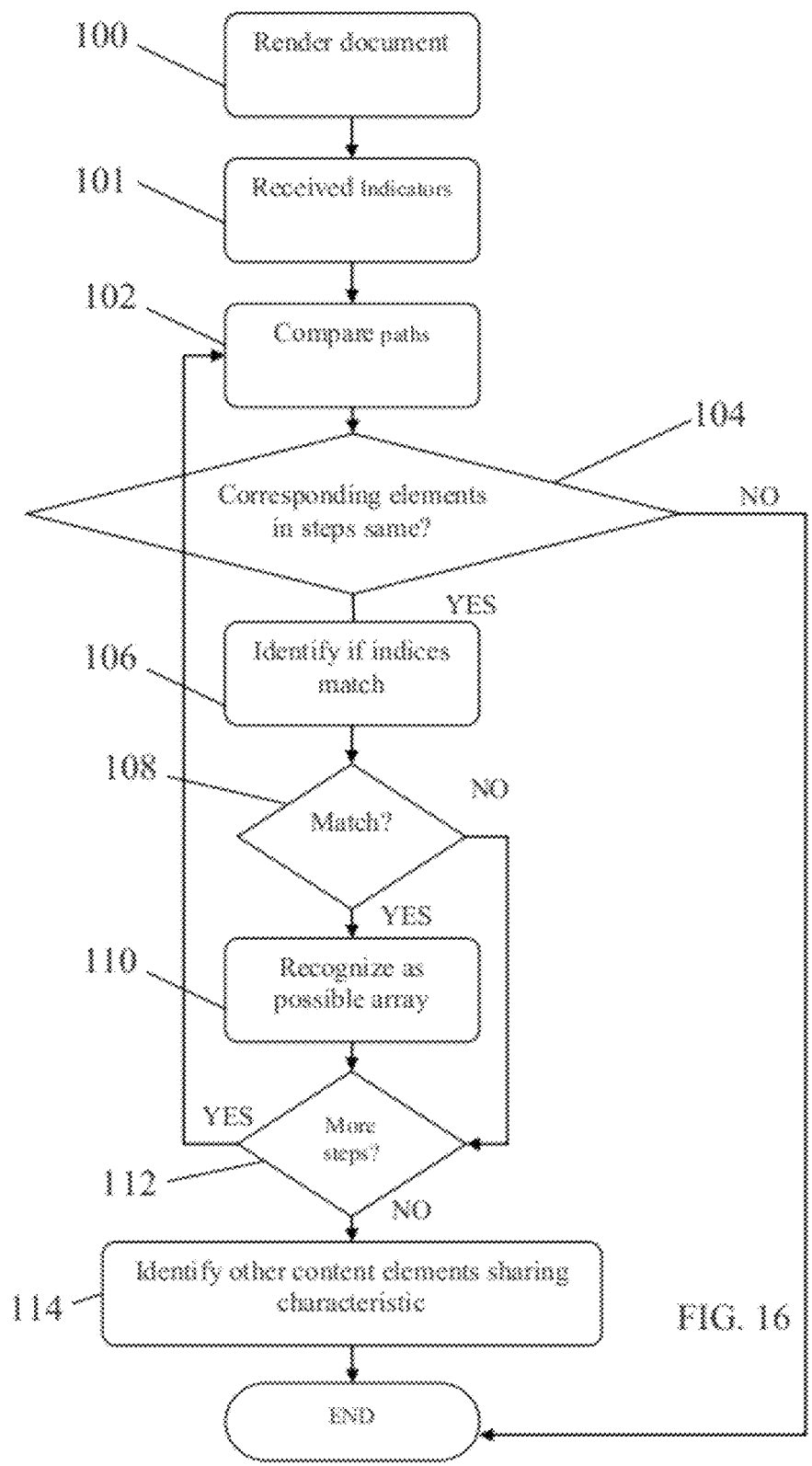
FIG. 16 is an example flowchart of an embodiment of a method to carry out array identification.

Referring to FIGS. 16 and 3, elements of paths for content elements 13 that may be represented as array elements can be identified using computer-readable instructions comprised in computer program 41 which when executed on electronic device 11 carry out the following method. Typically the program 41 executing the method will be used by a developer of an output structured electronic document to define paths that identify content elements 13 in an existing structured electronic document 15, such that the content of the content element 13 can be extracted from the existing structured electronic document 15 in the output structured electronic document, such as page 800 (see FIG. 2); however, the program can be used to define paths to the content elements 13 to use for other purposes.

To compare the paths of two content elements 13, at 102, starting from the path root, for each step in the respective paths, determine if the element is the same. At 104, if any corresponding element in a step is not the same, comparison ceases as a pattern has failed to be recognized. At 106, for corresponding steps where the respective elements are the same, identify if indices match in the two paths. At 108, if so, the element is recognized at 110 one that can be represented as an array. Prior to pattern recognition at 101, at 100 structured electronic document 15 can be rendered to display device 1104 and pattern recognition utilizing arrays is a method of identifying with a processor 1100 a common characteristic between at least two content elements 13 in a structured electronic document 15. At least two separate indicators of content elements within the structured element document 15 can be received through input device 1106. At 114 further content elements 13 in the structured document 15 that share the common characteristic can be identified for example by iterating through array indices in a path. Further content elements 13 that share the common characteristic can be highlighted of the display device 1104 to a user.

In either case, processing is returned at 112 to 102 if there are more steps in the path.

When using the example path language described herein in further detail, a determination if the element is the same at 102 can be performed by determining if the element name and element ID are the same.

Where pattern recognition results in elements in the respective paths that can be represented as an array, the elements can be replaced in the paths by an array element.

For example, given the two paths:

/div[4]/div[3]/table/tr[9]/td[2]/a/href
/div[4]/div[3]/table/tr[10]/td[0]/a/href.

The resulting pattern will be identified as:
/div[4]/div[3]/table/tr[x]/td[y]/a/href.

Hence, n-dimensional arrays can be identified for paths according to the above method, instructions and program 41.

Such arrays can be identified from paths for two content elements 13. In the example above, a 2-dimensional array is identified, and any element with the matching path (having indices in place of x and y) can be identified by the path.

In use, paths specified using n-dimensional arrays can be utilized by one or more computer programs 41 executing on electronic device 11 to identify content elements 13 for example by iterating through the array indices based on a single path. This can provide a simple and efficient method to identify content elements 13 within a structured electronic document 15.

The paths can be used in, for example, a CED 1 for further use in identifying content elements 13 in a structured electronic document 15. CED 1 can be used by one or more computer programs 39 to identify content elements 13. For example, a path can be used in a structured electronic document that is a CED 1.

Further aspects of pattern recognition including receipt of at least two indications of content elements 13 within a rendered structured electronic document 15 are described herein with regard to an example tool embodiment.

Content elements 13 within structured electronic document 15 can be identified by paths that are similar to XPath paths, but with available markup language elements to define the path selected from a subset of markup language elements such that the path is less susceptible to changes in the structured electronic document 15. For example, it is possible to restrict the path to include only structural parents, i.e. the elements that define the structure of the document as opposed to its decoration. For example, in HTML, the <div> element defines structure, but the <b> element only defines element decoration. Ignoring non-structural elements in a path improves element identification immunity to changes in the structured electronic document.

An example method to restrict the path to include only structural elements for an HTML document 15 is to require the path nodes to be selected from a subset of HTML elements such as: head, div, span, form, table, thead, tfoot, tr, td, th, h1, h2, h3, h4, h5. In this case any other elements not included in the subset would be considered non-structural for the purpose of paths for elements within the structured electronic document. It is recognized that the above listed subset is not an exhaustive listing of all elements that might otherwise be considered structural. Other structural elements could be included in this subset if desired. For example, structured electronic documents in specific content areas, for example documents using Chemical Markup Language (CML), can have other markup language structural elements used on a regular basis. The above listed subset is considered to result in sufficiently unambiguous paths while resisting susceptibility to changes between structured electronic documents 15, for example between an instance of a structured language document 15 used to create the common expression 3 and the data structure definition 4, and an instance of a structured electronic document 15 to which the common expression 3 and data structure definition 4 are applied to extract content elements 13.

Paths can identify parent/child relationships, element indices, element ids, and the whole or partial array of elements.

An example of a path containing a reduced subset of HTML elements for an href content element is:
/div/div[4]/div#short/table/tr[x]/td/a/href, where:

'/' (forward slash) defines parent child relationship: parent/child,

'[ ]' (square brackets) defines element index for arrays: element[index], and

'# short' (number sign) defines element id: ="short" is merely an example id and not an HTML element.

A variable in place of an index indicates that the whole array is identified (e.g. element[x]).

A polynomial in place of an index can indicate that a portion of the array is identified (e.g. element[2x]—all elements with even index).

The last part of the path indicates what the path represents. If it is an attribute name, the path represents the value of that attribute; if it is the keyword 'text', the path represents the textual content of the element.

Further details of a possible path language for a subset of markup language elements are described in Table 1.

TABLE 1

| Path Syntax | Description |
|---|---|
| parent/child | Indicates the element on the right of the / is nested within the element on the left (i.e., the element on the right is a child of the element on the left, which is the parent of the element on the right). |
| parent/child#id | Indicates the child of the specified parent with the specified id (the string to the right of the #). |
| parent/child[3] | Indicates the fourth* element encountered as a child of the specified parent. The indices are increased by completing an inorder traversal of a document object model (DOM) tree while ignoring non-structural nodes when searching for children. Here ignoring essentially means treating the children of non-structural nodes as children of the non-structural node's parent node. |
| parent/child[x] | Indicates all children of the specified parent. |
| parent/child[2x+1] | Indicates an array consisting of: child[1], child[3], child[5], etc. The elements within the array are determined by the expression between the brackets (in this case, 2x+1 - every odd indexed child). |
| parent/child[x]/gchild[y] | Indicates all grandchildren of the specified parent. A grandchild is a child of one of the parent's children. A common instance is table/tr[x]/td[y] to get all cells in a table. |

*Counting begins at 0.

For example, the path /div/div[4]/div#short/table/tr[x]/td/a/href identifies an "href" element of content within the following HTML structure:

```
<html>
  ...
  <div>
    <div>...</div>
    <div>...</div>
    <div>...</div>
    <div>...</div>
    <div>
      <div id="short">
        <table>
          <tr>
            <td>
              <a href="...">...</a>
            </td>
          </tr>
          <tr>
            <td>
              <a href="...">...</a>
            </td>
          </tr>
          ...
          <tr>
            <td>
              <a href="...">...</a>
            </td>
          </tr>
          <table>
```
```
        </div>
      </div>
    </div>
    ...
</html>.
```

It is understood that there could be any number of non-structural nodes surrounding the nodes specified in the path and that between the nodes specified in the path, there could be any number of other nodes with different names than those specified.

As the path does not include non-structural nodes, it is more resistant to subtle changes in the markup language code of the document than a corresponding path in accordance with the XPath.

Since the above path language captures only the structure of content elements (by paths), it does not matter which search results page instance is used to choose content elements 13 for creation of a CED 1.

The structural element path language approach assumes that two page instances for the same page type have similar structure. For example, depending on which keyword is entered in an Amazon.com search, a different web page containing search results will be produced. Amazon is a trademark of Amazon.com, Inc. However, both search results page instances will correspond to the same structure. The structural resemblance assumption will usually hold because dynamic web content is usually produced by the same template (e.g. a template scripted in a scripting language such as JSP, Active Server Pages (ASP), and PHP).

Also, the above path language allows an index variable to be used to indicate a list of elements. In the example above, this is shown on the table row(tr) element, indicating that all table row (tr) elements of the parent table are to be included when the elements are fetched from the path.

While some content elements are independent; others can be combined into groups. Grouping can be incorporated into the data structure 49 to permit a node array element that includes elements that are themselves arrays. For example, a search of Amazon.com produces a structured electronic document 15 with a list of items. Each item has a title and price. The data structure 49 can include a data element 5 that is an array of complex types including title and price, rather than two parallel arrays.

Element grouping can be used for better organizing content when displaying it to a user.

Figure 17:
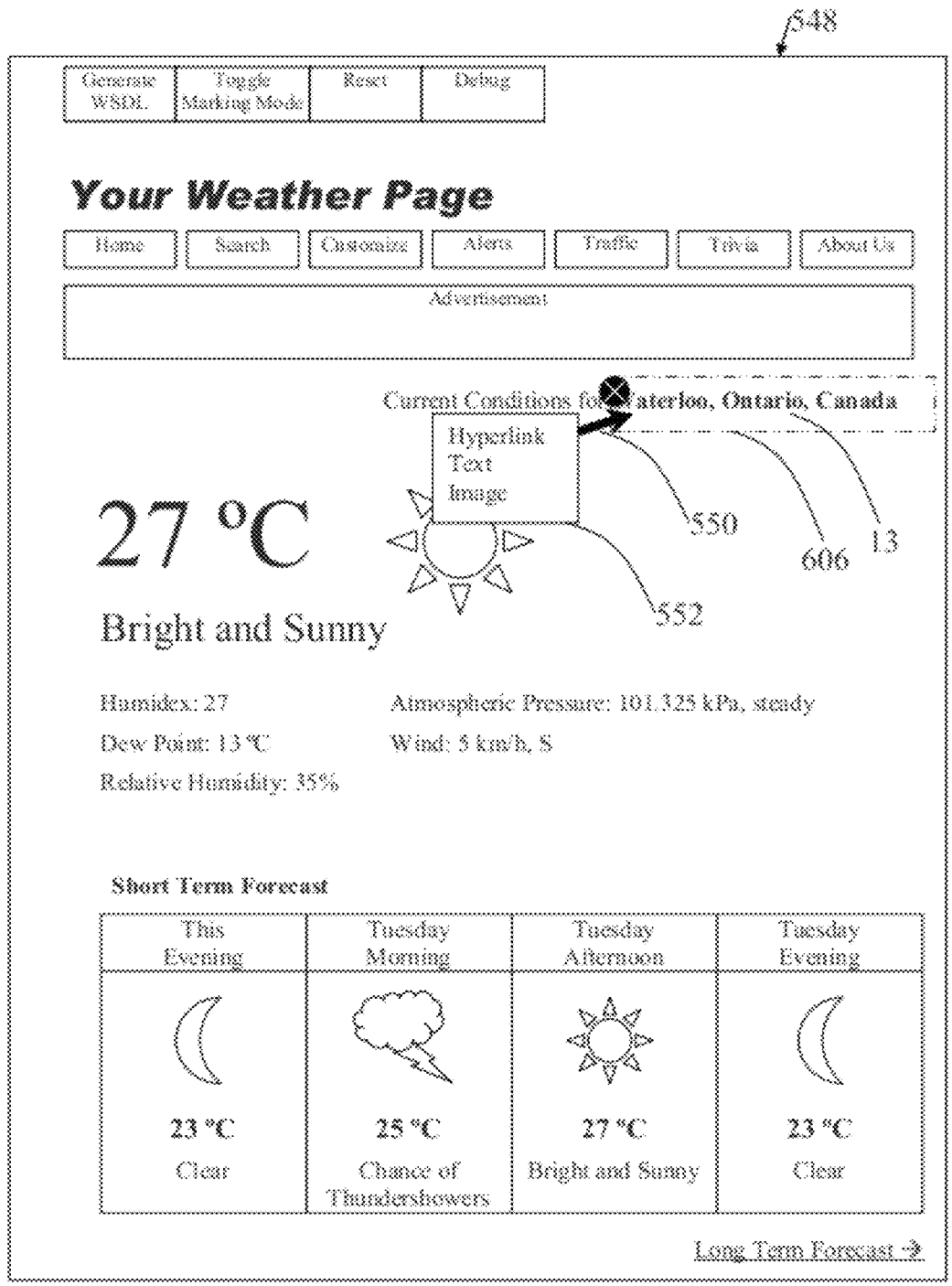
FIG. 17 is an example user interface screen for visual content element selection.

Referring to FIG. 17, the tool displays to the user a screen shot 548 rendered version of the document 15 with content elements 13. For example, the document 15 can be rendered in a browser 40 window such that the document 15 will look similar to how the document 15 would ordinarily appear in a browser 40 window.

In order to select content elements 13 in the document 15, the tool receives a user indication from pointing device 1106 when a cursor 550 is located over a content element 13 in the rendered document 15. To assist in visual selection, the tool can highlight a content element 13 at the pointing device before receiving an indication of the content element 13.

Selection ambiguity resolution can be utilized to identify a selected content element 13 based upon a selected visible content element 13. It is to be recognized, as with other aspects described herein, that selection ambiguity together with or separate from visible selection can be utilized separate from other aspects described herein to identify as selected content element 13. Selection ambiguity resolution can significantly assist users in working with structured language document content elements.

It is to be understood that various aspects of the tool can be embodied independently of other aspects, or utilized in embodiments other than the specific tool embodiment described herein.

Figure 18:
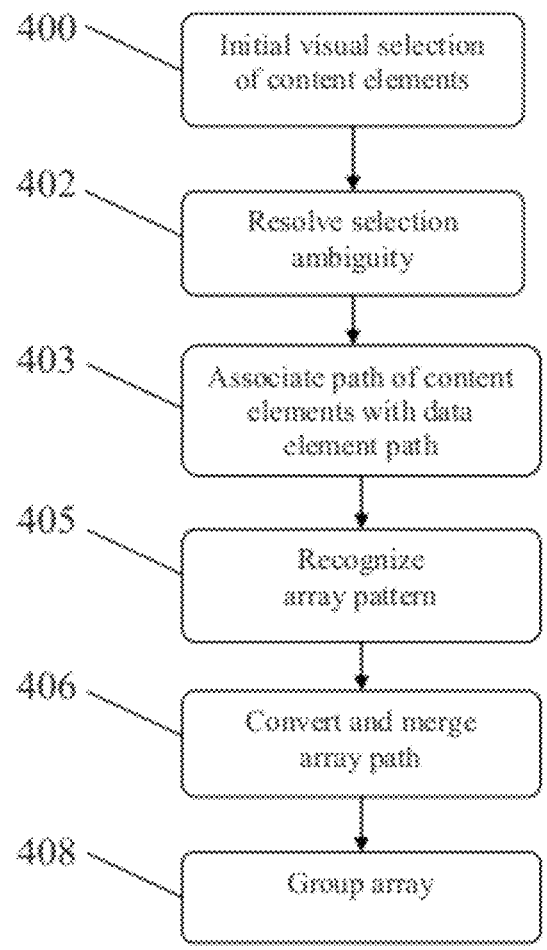
FIG. 18 is an example flowchart of instructions within a tool to perform an automated method of generating a content extraction document.

Referring to FIG. 18, for example, an embodiment of the tool will be described that embodies a method to provide initial visual selection of content elements at 400, selection ambiguity resolution 402, associate a path of content element 13 with data element path 403, array pattern recognition 404, array path conversion and array path merger 406, and array grouping 408. Each of these aspects can be embodied independently of one another and of the tool, and each of these aspects may be used independently of one another.

Figure 19:
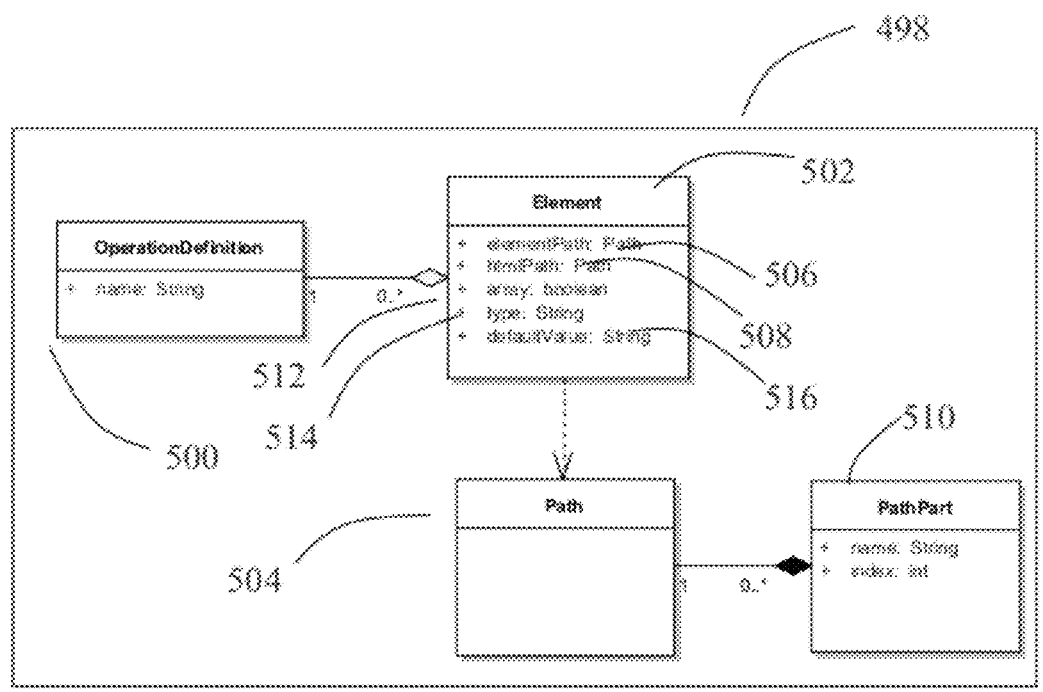
FIG. 19 is an example object model for the tool of FIG. 18.

Referring to FIG. 19, the tool stores gathered information in memory in a data structure 498, such as an object structure (for example, if the tool is a Firefox plug-in, the structure 498 would typically be based on JavaScript objects).

The tool keeps an OperationDefinition object 500 containing Element objects 502. Each Element object 502 points to two Path objects 504, one Path object 504 representing a data element path (elementPath 506) within data structure 49 and a second Path object 504 representing a content element 13 path (htmlPath 508) in document 15. Each Path object 504 contains PathPart objects 510 that make up the path. Each Element object 502 further specifies whether or not the object 502 represents an array element in array property 512, and the type of the element in a type property 514, and a defaultValue property 516 for the element.

Figure 20:
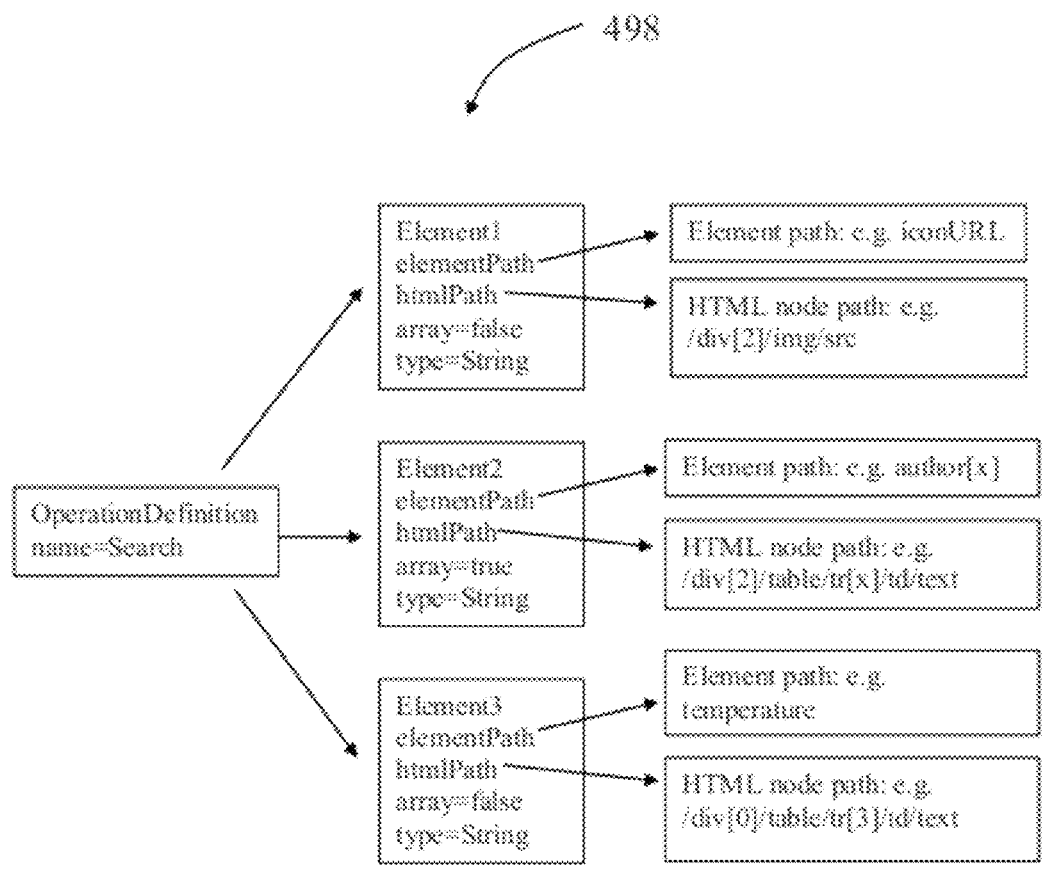
FIG. 20 is a sample populated example object model of FIG. 18.

Referring to FIG. 20, an example data structure 498 contains sample data for one OperationDefinition named Search with three Elements, Element1, Element2, Element3. Element1 has an elementPath, "iconURL", and an htmlPath, "idiv[2]/img.src". Element2 has an elementPath, "author[x]", and an htmlPath, "idiv[2]/table/tr[x]/td/text". Element3 has an elementPath, "temperature", and an htmlPath, "idiv[0]/table/tr[3]/td/text". Element1 and Element3 are not arrays, while Element2 is an array.

Although the data structure 498 is described for one operation, the principles can be extended to multiple operations in which case there will be multiple OperationDefinition objects in the data structure in memory.

Figure 21:
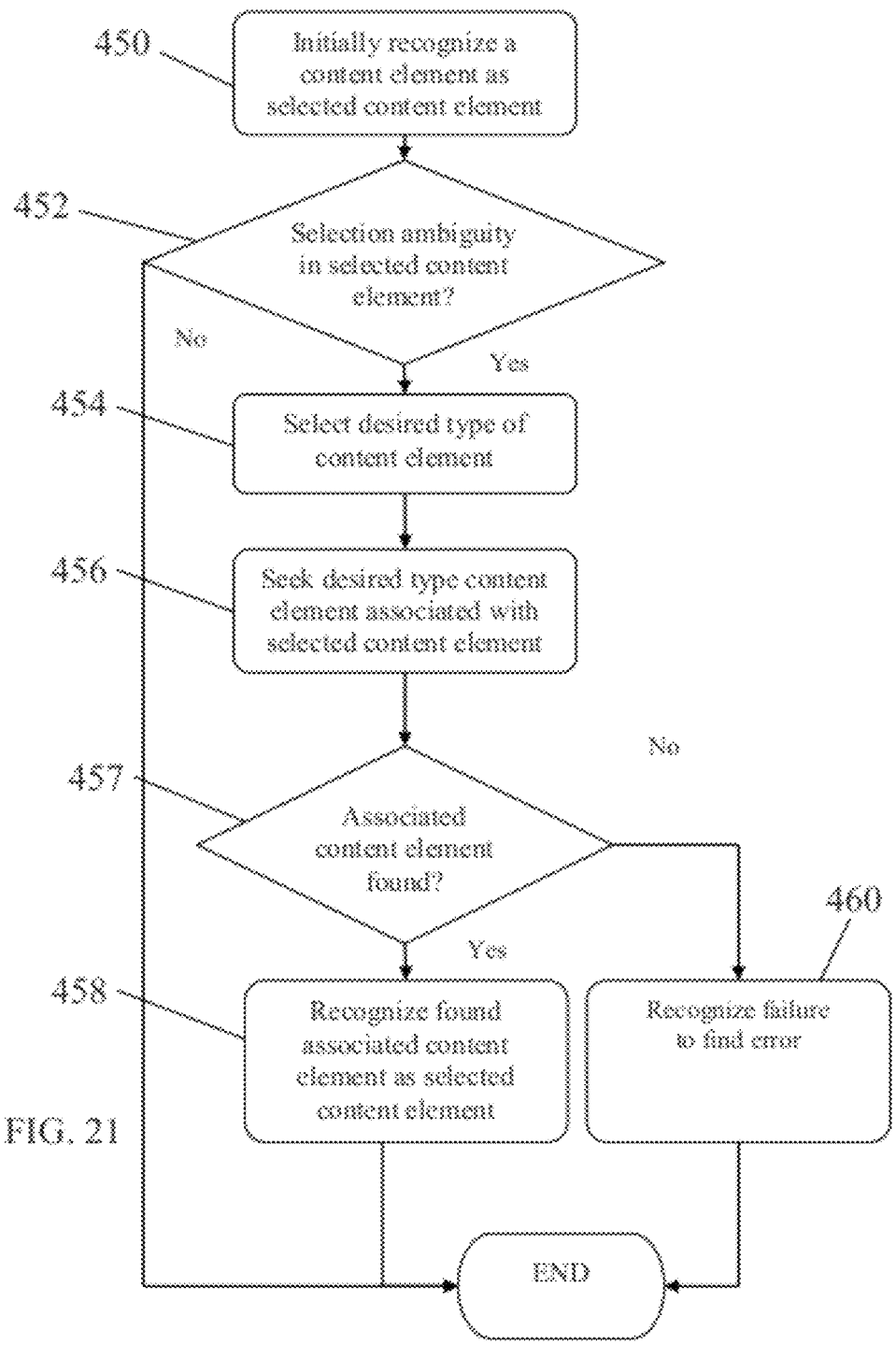
FIG. 21 is an example flowchart for instructions within an example tool for automated selection ambiguity resolution for visual content element selection.

Referring to FIG. 21, many HTML nodes are invisible but still clickable on the rendered page. For example, a hyperlink content element 13 is not visible by itself; it covers other visible content elements 13 such as image or text. Where one element of content 13 surrounds another element of content 13, the elements of content 13 are coincident In order to resolve ambiguities between visible and invisible clickable elements, the tool at 450 by default initially recognizes the visible content elements 13 as the selected content elements 13. It is recognized that the tool could default to the invisible element if desired. The tool can receive instructions regarding the content element 13 being selected by the user to assist in resolving the ambiguity, such as for example whether the content element 13 is text, hyperlink, or image.

Referring to FIGS. 17 and 21, for example, the tool can determine at 452 if there is an ambiguity with respect to a type of the content element 13 when the cursor 550 is positioned over the location of a rendered content element 13, and, if so, at 454 the tool can provide the user with the ability to access a right click menu 552 from which one of the possible content element 13 types may be selected. Once the type is selected, the tool at 456 seeks an associated content element 13 that meets the selected type. If at 457 an associated content element 13 is found then the tool at 458 recognizes a found content element 13 as the selected content element 13. If the tool cannot find an associated content element 13 then the tool fails to find an associated content element 13 and returns an error message at 460 to the user, for example through the display 1104. For example, the error message could be a "selected content element type not found".

In another example, non-content elements, for example structural elements such as, for example in HTML, tables "<table>"/divs "<div>"/rows "<tr>"/columns "<col>"/etc surrounding the desired content element 13 may not be visible, but they may be clicked if a cursor 550 is outside a clickable portion of a desired visible content element 13 when a user click is received content element. For example, a user may be attempting to select a text content element 13, but the cursor 550 is located outside the text content element 13, over a table row (tr) element containing the desired text content element 13.

Figure 22:
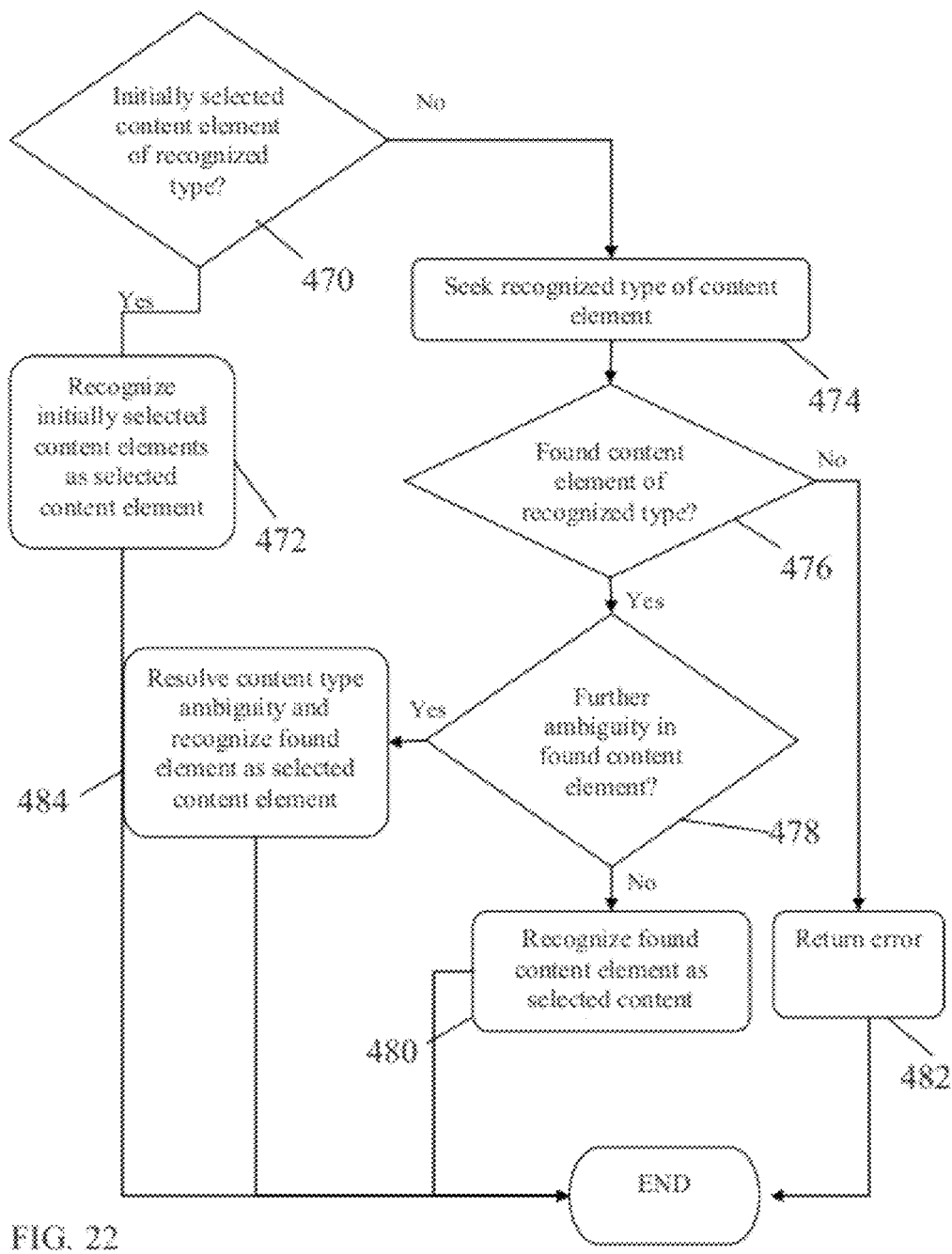
FIG. 22 is a further example flowchart for instructions within an example tool for automated selection ambiguity resolution for visual content element selection.

Referring to FIG. 22, the tool assumes that a user is attempting to select content elements 13, such as for example text, hyperlink, or image. The tool at 470 examines the initially selected element to determine if it is one of the recognized types for a content element 13. If so, then the tool has resolved a non-content type ambiguity and the content element 13 is recognized at 472 as the selected content element 13. If not, then the tool at 474 seeks a recognized type of content element 13 that is associated with the selected element. If the tool at 476 finds a recognized type of content element 13 then, unless there is a further ambiguity at 478 in a content element 13 that is found, the tool at 480 recognizes a found content element 13 as the selected content element 13. If the tool cannot find an associated content element 13 at 476 then the tool fails to find an associated content element 13 and returns an error message at 482 to the user, for example through the display 1104. For example, the error message could be "Associated content element not found.". At 478 and 484, the tool can, for example, utilize the prior method beginning at 452 to resolve a content type ambiguity before the tool at 480 recognizes a found content element 13 as the selected content element 13.

Figure 23:
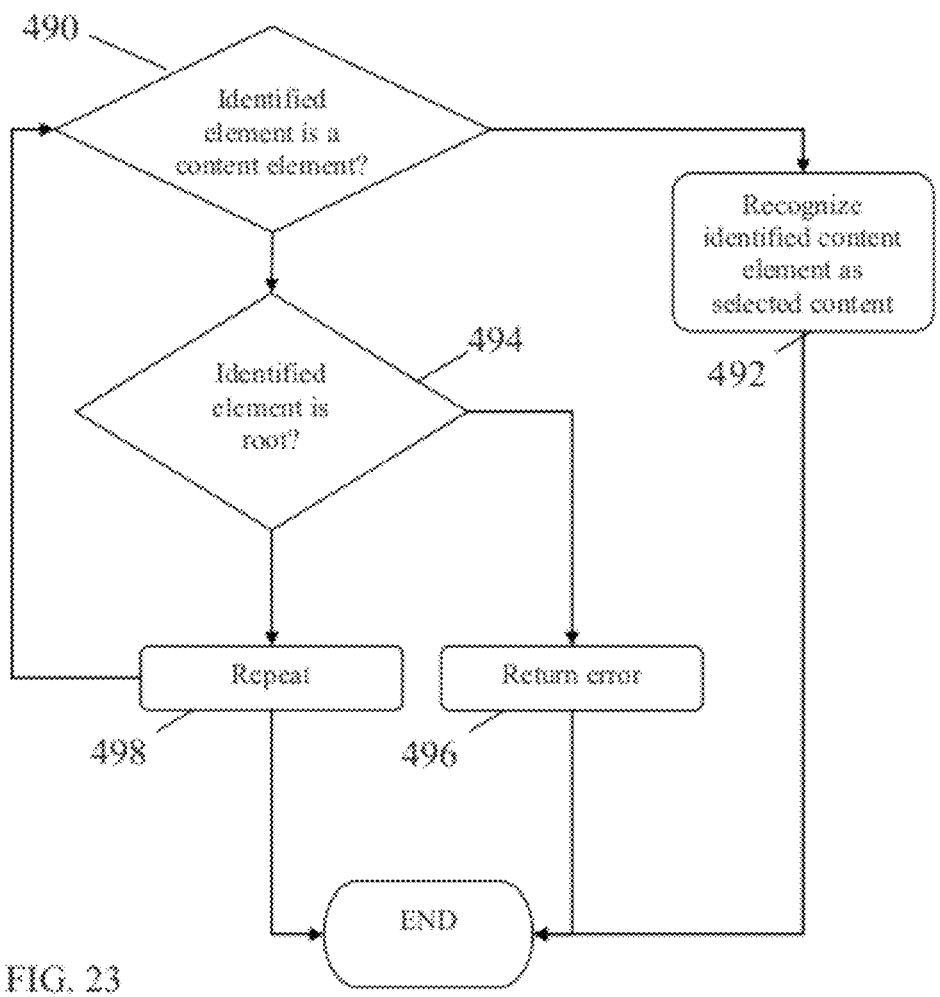
FIG. 23 is an example flowchart for instructions within an example tool for visual content element selection.

Referring to FIG. 23, as a further alternative example the tool can be programmed to execute on the electronic device 11a computer program containing instructions to the computer to execute in accordance with the following method to select a desired content element 13 based upon an element identified through a user input device from a rendered structured electronic document 15.

An example embodiment of the method including preorder traversal through the identified element's children can perform as follows:

490/492: If at 492 a content element 13 is found in the identified element then at 494 stop and recognize the found content element 13 as the selected content element.

490/494/496: If at 490 a content element 13 is not found and at 492 the identified element is a root element then at 496 return an error message to the user, for example through display 1104 that a content element 13 cannot be found for the identified element, so that a user can make a further attempt to click on a desired content element 13.

490/494/498: If at 490 a content element 13 was not found and at 494 the identified element is not a root element then the tool performs repeats at 490 for each of the identified element's parents as the identified element until the document 15 root element is reached and an error is recognized at 496, or a content element 13 is found and recognized at 492.

Figure 24:
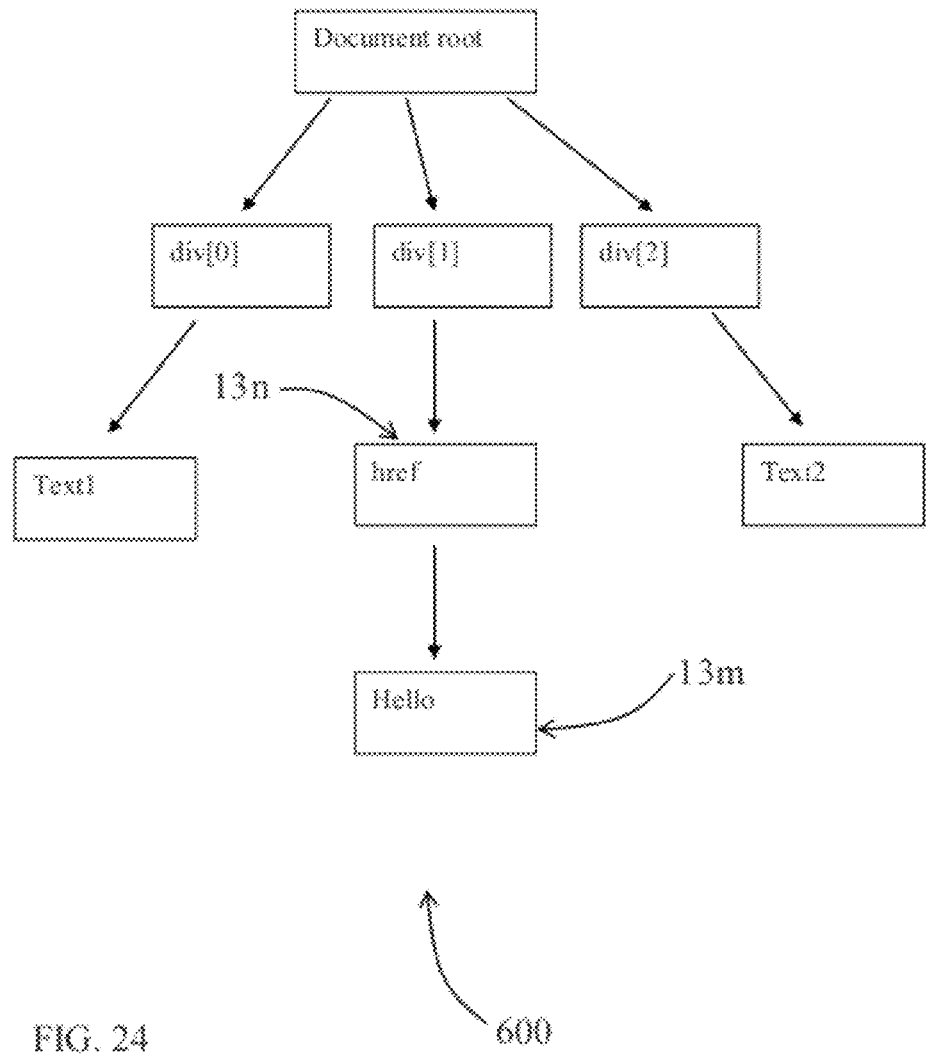
FIG. 24 is an illustration of example selection ambiguity resolution in accordance with the flowchart of FIG. 21 on an example DOM (document object model) tree representing an example structured electronic document.

Referring to FIG. 24, as an example, starting from a "Hello" text content element 13*m* identified through a user input device 202 from a rendered structured electronic document 15. identified element Hello text 13*m*, the tool will try to find an associated hyperlink element 13*n*. Example HTML might be:

```
<div>Text1</div>
<div><a href="/abc.html">Hello</a></div>
<div>Text2</div>.
```

The DOM for the structured electronic document is represented in a DOM tree 600 in FIG. 24.

The user indicates desire for a hyperlink content element 13 (for example using a right click menu as discussed previously) and clicks with the cursor 550 over the "Hello" text element 13*m*. The tool checks children first (no children), and then it will find the hyperlink content element 13*n* as clicked element's ("Hello" text13*m*) parent element.

Figure 25:
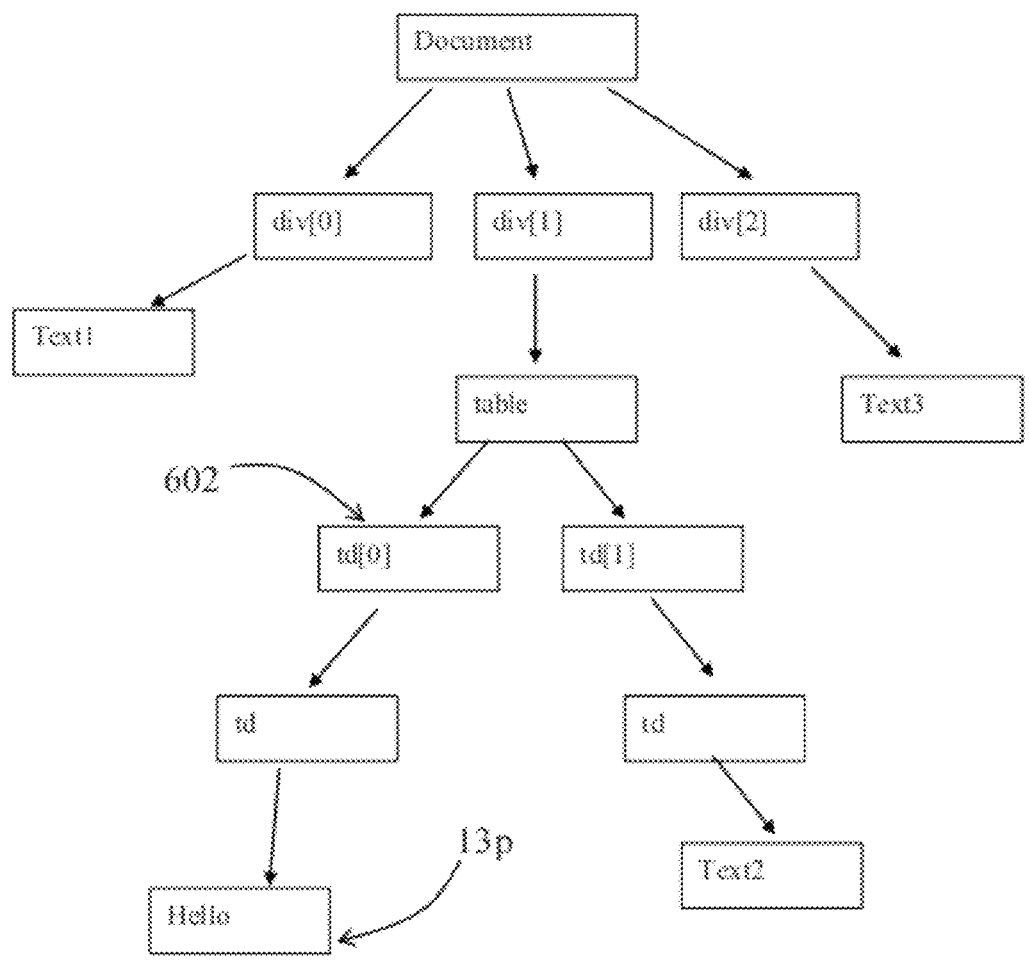
FIG. 25 is an illustration of example selection ambiguity resolution in accordance with the flowchart of FIG. 22 on a further example DOM tree representing an example structured electronic document.

Referring to FIG. 25, as a further example, given the HTML:

```
<div>Text1</div>
<div><table><tr><td>Hello</td></tr><tr><td>Text2</td></tr></table></div>
<div>Text3</div>
``` a user would like to select a text content element 13*p* (desire for a text element is indicated by default), but clicked on a non-content element 602, a table cell (the cursor was outside a clickable portion of the text element of contact 13*p*) and because the table was invisible, the user did not know he clicked on a table row element 602. The tool checks children first and finds the text content element 13*p*.

The tool also determines a markup language path of a selected element for example content element 13*p* from the example described immediately above. A markup language path can be determined, for example, by performing a pre-order transversal through the elements of document 15 starting from the root and looking for the selected element 13*p*. While doing traversal the tool can record element indices for elements in the path.

An example Java-based pseudo-code embodiment of the method can be expressed as follows, where elements of the document 15 are referred to as nodes:

```
Path selectedNodePath = getPath(emptyPath, documentRootNode,
   selectedNode);
public Path getPath(Path path, Node root, Node selectedNode)
{
   if(node != null)
   {
      Map<String, int> indices = new Map<String, int>( );
      for(Node child : node.getChildren( ))
      {
         String childName = node.getName( )
         int index = indices.get(childName) + 1
         indices.set(childName, index)
         Path childPath = path + new PathPart(node.getName( ),
   index)
```

```
         if(child == selectedNode) return childPath;
         else
         {
            Path selectedNodePath = getPath(childPath, childNode,
   selectedNode)
            if(selectedNodePath != null) return selectedNodePath
         }
      }
   }
}
```

As previously described with respect to FIG. 12, the tool shows a pop-up window 222 asking the user to enter the element name for the selected content element 13.

The user enters an element name and clicks button 224 ok. Additional data input fields such as input boxes or selection buttons, not shown, can be provided on pop-up windows 222, or further pop-up windows, not shown, can be provided, for the user to specify element type such as string, integer, date, duration, etc. Element type information can enable content extraction engine 61 to produce a more useful DOM structure 49. For example, if an element of type date is specified, content extraction engine 61 puts a date object (as opposed to string) in data structure 49, for example by loading data in ISO 8601 format. This would allow presentation tier 42 to format date as specified in the template. Similarly, further date entry fields or pop-up windows, not shown, can be provided for the user to specify an element default value and the content extraction engine 61 would substitute a default value in the data structure 49 if the value is not found in the extracted content.

Following element naming as set out above the tool adds a new element 5 for the selected content element 13 to the data structure 49 as follows, assuming that the markup language of the document 15 is HTML:

a. Element path = <elementName>. E.g. temperature, as named by user above
b. HTML path = <path determined as described above>
c. Array = false
d. Type = <set if entered by user>
e. Default value = <set if entered by user>

Referring again to FIG. 17, following element naming and addition to the data structure 49 the tool highlights the selected content element 13 in the rendered structured electronic document 15. The selected content element 13 can be highlighted for example by providing a colored overlay over the selected content element 13 as represented by dashed outline 606. Other highlighting techniques, such as for example an outline, will be evident to those skilled in the art.

At this point the tool has completed user selection of a content element 13 from the structured electronic document 15. The path of the content element 13 in the structured electronic document 15 is known, named and stored.

Figure 26:
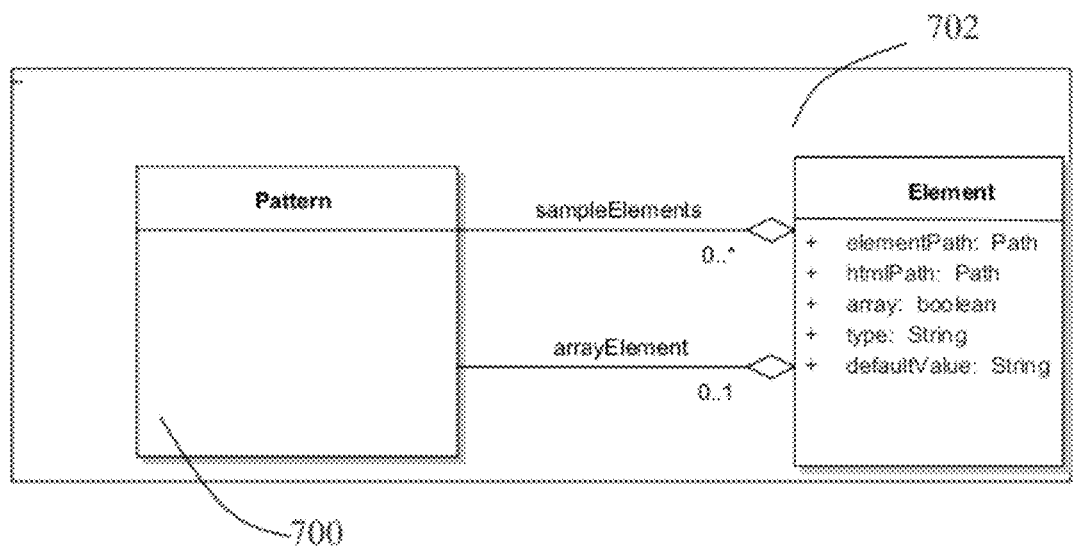
FIG. 26 is an example object model for use in array pattern recognition.

Referring to FIG. 26 and the previous description with respect to FIG. 11, an embodiment of an example pattern recognition method incorporated into a tool can involve a user selecting at least two elements 13. Typically a user will select elements that the user believes participate in a desired pattern. Element selection can be performed, for example, as described above by indication through a pointing device 1106. For pattern recognition, the tool, for example, keeps a Pattern object 700 containing Element object 702 for content elements 13 to be considered in pattern recognition (sample elements) and resulting array element information.

A pattern can be determined by selecting two elements participating in the pattern. However, to potentially improve refinement of pattern recognition, the tool can allow choosing more than two elements for pattern recognition.

For each selected content element 13, a user holds a cursor over the element 13 and provides a key press, such as pressing a plus sign, "+" key on a keyboard 1108 to indicate the selection of the element 13 for pattern recognition. Other key presses or indications could be used to indicate the selection of the element for pattern recognition. The "+" key press is received by the tool as a user indication that pattern recognition is desired for the selected element 13. Once the "+" key is pressed, the element 13 is highlighted to indicate that it is to be part of pattern recognition, and a corresponding Element object 702 for the selected element 13 is added to the Pattern object 700 as a sample element. A previously indicated content element 13 can be cancelled, for example, by receiving from the pointing device 1106 an indication to cancel through a cancel indicator 1120 such as cancel indicator 1120.

Once two elements 13 have been chosen in the pattern, the tool shows a pop-up window 212 asking the user to enter a pattern name in a textbox 210 (see FIG. 11). The user enters the array name (optionally the user can enter element type and default value) and indicates acceptance of the user name for example by indicating "OK" on button 214.

With the selected elements the tool performs pattern recognition on the markup language paths (HTML paths in the examples used herein, although pattern recognition is not limited to HTML paths) associated with the Elements in Pattern object (elements selected for pattern recognition). Pattern recognition outputs a single markup language path for the selected elements containing variables in place of some indices (an array element path).

The tool can, for example, perform array pattern recognition and array path conversion in accordance with the following pseudocode:

```
Input: Set of HTML paths
Output: A single HTML path containing variables or error
    1. Let P be the set of HTML paths
       Let t be the resulting HTML path
    2. Let t = the first path from P
    3. For each path p in P do:
           a. If p and t have a different number of parts, fail pattern
              recognition and exit
           b. Let L = length of t
           c. For j = 0 to L − 1 do:
                  i. If j-th part name in p is different from j-th part name in
                     t, fail pattern recognition and exit
                  ii. If j-th part index in p is different from j-th part name in
                      t, array pattern is recognized and the path is
                      converted to an array path by replacing j-th part in t
                      with a variable (x,y,z, ...). Variable names should be
                      unique within path only.
    4. return t as the result
```

The tool can then create a corresponding array data element path (Element Path) for the array content element path (htmlPath) created above. For example, the tool can determine an array data element path employing an embodiment of a method reflected in the following pseudocode:

```
    a. Path arrayElementPath = new Path( );
    b. For each variable in array htmlPath path going from left to right
       do:
           i. Add a new path part to arrayElementPath the path part
              name is globally unique artificial path part name like L0,
              L1, ... and the array index is the variable.
       c. Add a new path part to arrayElementPath where path part name
          is a user-entered array name.
```

For example, given an HTML path table/tr[x]/td[y]/text[x], and user entered array name "author", the array data element will be L14[x].L15[y].L16[z].author.

The tool then creates an Element object and sets this element as arrayElement in the Pattern object. The created Element object contains:

```
    a. Element path = arrayElementPath (from above)
    b. HTML path = array htmlPath from above
    c. Array = true
    d. Type = <set if entered>
    e. Default value = always NULL
```

For each sample element in the Pattern object, the element is removed from the OperationDefinition object 500. An arrayElement from the Pattern object is added to the OperationDefinition object 500. This results in a merged array content element 13 path for the selected elements. This also generates a data structure 49 definition with corresponding merged array data elements 5.

The tool then highlights all elements whose HTML element paths match the array HTML element path (e.g. by providing a colored overlay over the selected node as discussed previously) from arrayElement in Pattern object. For example, the literal paths "div/table[0]/tr[0]/td/text" and "div/table[0]/tr[1]/td/text" each match array element path "div/table[0]/tr[x]/td/text path" and would be highlighted as a match.

The tool has then completed array pattern recognition, array path conversion, and array path merger.

The tool can further incorporate grouping of array data content elements 13. For example, the tool may embody instructions to carry out the following method:

1. The tool receives user selection of two or more elements 13 from different array elements 13. Element 13 selection can be performed in a similar manner to selection of elements 13 as previously described.

2. For each array element the user wants to add to the group, user holds mouse over any element of the array and provides a key press, for example a key press of "+" (or some other indicator to the tool of user desire to add array to the group) to add the array to the group as discussed previously for indicators for pattern recognition. Once "+" is pressed, the array element 13 is highlighted to indicate that it has been selected to participate in the group, and the corresponding Element object is added to a Group object, in a similar manner that Element Object 702 is added to a Pattern Object 700.

3. Once one element 13 has been added to the group as described above, the tool shows a pop-up window asking user to enter group name (as described previously).

4. User enters group name (or multiple names, e.g. dot-separated) and clicks ok.

5. Group data elements in data element path, for example, in accordance with the following pseudo-code:

```
a. Let n = length (number of path parts) of the longest element path
   in elements in Group object.
b. Let groupPartName be an array of length n−1 field with globally
   unique group part names (G0, G1, etc). If group names were
   specified, then group names will be used instead of G0, G1, G2.
   For example, if book.author was specified than groupPartName =
   {book, author};
c. For each element in Group object do:
   i. for(int j = 0; j < elementPath.length − 2; j++) do:
         1. elementPath.part[j].name = groupPartName[j]
6. End.
```

For example, if elements with the following data element paths are selected for grouping:

```
L22[x].L23[y].name
L31[x].L32[y].age
L17[x].price
L15[x].title
``` then, in accordance with the above, the resulting data element paths will be:

```
G7[x].G8[y].name
G7[x].G8[y].age
G7[x].price
G7[x].title
```

If "book" and "author" are specified as group names, the resulting data element paths will be:

```
book[x].author[y].name
book[x].author[y].age
book[x].price
book[x].title.
```

The tool can then generate a content definition, which may for example form a CED 1. The content definition has the common expression 3 and data structure definition 4 previously referenced. The data structure definition 4 defines the structure for instances of data structure 49. The service definition, service input definition, request message, response message, and port type, and bindings all form part of a common expression 3 identifying content elements 13 in a structured electronic document 15. The data structured definition 4 is defined according to the common expression as set out above. For this example, it is assumed that the operation name is "Search".

Content definition generation is initiated, for example, by the tool presenting a user input interface to a user to request generation. Such an input interface might be, for example, a "generate WSDL" button on a toolbar. Other forms of input interfaces, such as for example a menu item, will be evident to those skilled in the art. As an alternative, the content definition may be generated automatically as required information is obtained by the tool.

As part of content definition generation the tool, for example, for content definition in a WSDL format as discussed elsewhere herein, a wsdl: service can contain a wsdl: port further containing an html:address location element pointing to an endpoint URL. For example:

```
<wsdl:service name="Service">
   <wsdl:port name="Port" binding="impl:Binding">
      <html:address location="http://[Host name]/service"/>
   </wsdl:port>
```

The tool then generates primitive string elements for each input parameter under requestElement complex type for types section. For example:

```
<xs:element name="requestElement">
<xs:complexElement>
<xs:sequence>
<xs:element name="keyword" type="xs:string"/>
<xs:element name="category" type="xs:string"/>
</xs:sequence>
</xs:complexElement>
</xs:element>
```

The tool then generates data structure definition 4 elements corresponding to element paths in OperationDefinition under responseElement complex type for types section. For example, elements 13 with paths:

```
query
book[x].author[y].name
book[x].author[y].age
book[x].price
book[x].title
``` will result in a data structure definition 4 of a data structure 49:

```
<xs:element name="responseElement">
<xs:complexElement>
<xs:sequence>
<xs:element name="query " type="xs:string"/>
<xs:element name="book" maxOccurs="unbounded">
   <xs:complexElement>
   <xs:sequence>
   <xs:element name="author" maxOccurs="unbounded">
      <xs:complexElement>
      <xs:sequence>
         <xs:element name="name" type="xs:string"/>
         <xs:element name="age" type="xs:integer"/>
      </xs:sequence>
      </xs:complexElement>
   </xs:element>
   <xs:element name="price" type="xs:double"/>
   <xs:element name="title" type="xs:string"/>
   </xs:sequence>
   </xs:complexElement>
</xs:element>
</xs:sequence>
</xs:complexElement>
</xs:element>.
```

The service output from the service output definition is the data structure 49.

If element type and default values are specified, they can be included in the data structure definition 4 as part of the element definition, for example a type of "xs.string" is provided for the title element above.

The tool then generates a request message, for example:

```
<wsdl:message name="SearchRequest">
<wsdl:part name="requestElement" element="impl:requestElement"/>
</wsdl:message>.
```

The tool then generates a response message, for example:

```
<wsdl:message name="SearchResponse">
  <wsdl:part name="responseElement"
  element="impl:responseElement"/>
  </wsdl:message>.
```

The tool then generates a portType:

```
<wsdl:portType name="SearchInterface">
   <wsdl:operation name="Search">
     <wsdl:input message="impl:SearchRequest"/>
     <wsdl:output message="impl:SearchResponse"/>
   </wsdl:operation>
 </wsdl:portType>.
```

Tool then generates a binding for each element in OperationDefinition object including htmlPath and bindingPath (elementPath), for example:

```
<wsdl:binding name="Binding" type="impl:SearchInterface">
    <wsdlsoap:binding style="document"
  transport="http://schemas.xmlsoap.org/soap/http"/>
    <wsdl:operation name="Search">
     <wsdl:input name="SearchRequest">
      <wsdlsoap:body use="literal"/>
     </wsdl:input>
     <wsdl:output name="SearchResponse">
      <wsdlsoap:body use="literal"/>
      <html:htmlBinding>
       <html:nodeBinding
   htmlPath="/div#outer_wrapper/div#content_wrapper/text[2]"
   bindingPath="responseElement.query"/>
       <html:nodeBinding
   htmlPath="/div#outer_wrapper/table/tr[x]/td[5]/table/tr[y]/td[2]/text
   " bindingPath="responseElement.book[x].author[y].age"/>
       <html:nodeBinding
   htmlPath="/div#outer_wrapper/table/tr[x]/td[5]/table/tr[y]/td[3]/text
   " bindingPath="responseElement.book[x].author[y].name"/>
       <html:nodeBinding
   htmlPath="/div#outer_wrapper/table/tr[x]/td[0]/text"
   bindingPath=" responseElement.book[x].title"/>
       <html:nodeBinding
   htmlPath="/div#outer_wrapper/table/tr[x]/td[4]/text"
   bindingPath=" responseElement.book[x].price"/>
      </html:htmlBinding>
     </wsdl:output>
    </wsdl:operation>
  </wsdl:binding>.
```

The CED 1 can be associated with one or more presentation templates 57, such that the content elements 13 retrieved from the document 15 can be put in a format for display by the electronic device 11 or the device 201. The templates 57 can be registered with the remote server 51 in a manner similar to the CED 1. Alternatively, if a presentation template 57 is not available, the content elements 13 can be sent as data structure 49, for example in JavaScript Object Notation (JSON) or XML format, to electronic device 11 or device 201.

It is to be recognized that a CED 1 can be associated with a presentation template 57 such that content extraction according to CED 1 can be used to initiate presentation generation according to template 57. For example, once the content elements 13 have been extracted then the CED 1 invokes a presentation tier 42 to perform presentation generation according to template 57. A CED 1 and presentation template 57 can be otherwise associated with one another. For example, the presentation template 57 can trigger content extraction according to CED 1, rather than pre-fetching content according to CED 1 and then initiating presentation generation.

A series of CEDs 1 and presentation templates 57 may be strung together to perform a sequence of operations on structured electronic documents; each CED 1 or template 57 calling the next, or being called under the control of a main CED 1 or template 57. For example, it may be required to enter information at a search request page prior to receiving search results. A CED 1 can be used for the search request page with a presentation template 57 to display the search request page. A further CED 1 can be used for the search result page. For interactions requiring multiple CEDs 1 without user input, multiple CEDs 1 can be initiated sequentially before a presentation template 57 provides information for transport to a user. Multiple operations can also be defined in a single CED1, for example using multiple port types in a WSDL format. Other configurations of CED 1 and presentation templates 57 can be possible depending on the allowed methods of retrieving the document 15. For example, it may be possible to directly address the search result page in an URL to prompt the return of a results page in one step. An example presentation template 57 for the weather example discussed herein might include the following template, where {@elementPath} is replaced with a value for the specified element path for the data elements 5 in the data structure 49, and {*arrayPath}html{*arrayPath} repeats the specified HTML for each array element in the array specified by arrayPath:

```
<html><body>
Weather for: <b>{@responseElement.location}</b>
<br/><br/><br/>
<table>
<tr>
<td>
<img src="{@responseElement.icon}"/><br/><br/>
</td>
<td>
{@responseElement.conditions}
{@responseElement.temperature}
{@responseElement.temperatureUnits}
{@responseElement.rain}
{@responseElement.snow}
</td>
</table>
<br/>
<table>
{*responseElement.shortTermDay}
<td>
{@responseElement.shortTermDay.day}
{@responseElement.shortTermDay.time}
</td>
<td>
<img src=" {@responseElement.shortTermDay.icon}"/>
</td>
<td width="20"> </td>
<td>
```

```
{@responseElement.shortTermDay.conditions}{@responseElement.-
shortTermDay.temperature}
</td>
</tr>
{*responseElement.shortTermDay}
</table>
</body></html>
```

Such a template 57 would render an output structured electronic document 800 similar to that shown in FIG. 2 for the weather example described herein. One can see that the page 800 can be more compact and mobile browser screen friendly. It can also exclude elements of the structured electronic document 15 that might not be renderable by a mobile browser. Other formats of the output structured electronic document 800 are possible at the discretion of the designer. The benefits of the output structured electronic document 800 are not limited to presentation on mobile devices, and can extend to other platforms.

Referring again to FIG. 7, on a personal content delivery embodiment a user registers a content extraction document CED 1 with a remote server 51, such as a computer executing a computer program and accessible through a public or private network 48*a*. The CED 1 defines a common expression for the remote server 51 to find a respective content element 13 within a structured electronic document 15. The structured electronic document 15 can, for example be located on a remote server 47 accessible through a public or private network 48*b*. The remote server 51 associates the CED 1 with the user. The remote server 51 can use a variety of computer-based techniques to associate the CED 1 with the user. For example, the remote server 51 can associate the CED 1 with a user account that requires authentication, such as a password, from the user. The remote server 51 can associate the CED 1 with an address, for example an Uniform Resource Identifier (URI), on remote server 51 that is known to the user. The remote server 51 can associate the CED 1 with a particular electronic device 11. The electronic device can be identified when the electronic device 11 communicates with the remote server 51 through the network 48*a*. The electronic device 11 can be, for example a wireless handheld device 201, such as for example by a device serial number transmitted from the electronic device 11 to the remote server 51.

As the device 201 is an electronic device 11, it contains similar components, although in alternate configurations appropriate to a handheld format. Accordingly, similar reference numerals for the components of the device 11 will be used for the components of the device 201, for example, display device 1104, input device 1102, processor 1100, keyboard 1108, pointing device 1106, and memory 1110. For simplicity, the description of the components of the device 201 will not be repeated, nor will the components of the device 201 be independently identified in the FIGS.

The remote server 51 can utilize cookies that identify the electronic device 11 associated with the user. A combination of techniques to associate a user with the CED 1 can be used. Such techniques can be used sequentially, such that each step must be performed, or in parallel to allow alternative ways to associate the CED 1 with a user.

Data to determine the association of the CED 1 with the user when extracting content according to the CED 1 is stored on a computer readable medium, which is accessible to the remote server, such as memory or a disk drive.

Content element structured electronic document. The CED 1 can be created at an electronic device 11 executing a computer program 39. The computer program 39 can, for example, comprise a browser 40 with extension or plug-in 41 as discussed herein. It is recognized that the electronic device 11 can be a wireless device, though it is further recognized that a handheld wireless device can be limited in its speed and screen size among other resources, which can make it impractical for this purpose. Alternatively, other computer programs running on a computer can be provided for use in creating a CED 1. Computer program 39 for creating a CED 1 could be accessed remotely. For example, the wireless service provider could run a web-enabled application on a remote server for users to create a CED 1. For ease of use, a CED 1 may be created utilizing a desktop computer as the electronic device 11 with a display 1104 (see FIG. 8) of sufficient size for the work, and to avoid any wireless network charges.

Automated generation of a CED 1 can be implemented through a tool such as the tool described herein. Such automated generation can allow a CED 1 to be created without access to underlying coding technologies, for example structured definition languages such as HTML, XML, or WSDL. This makes it possible for users to create their own CEDs 1 for registration. It is also possible for developers to generate CEDs 1 in an automated manner. Although developers can have the knowledge necessary to manually create a CED 1 based upon the principles described herein, the use of a tool with automated generation capabilities can make the creation much more efficient.

Upon registration, the remote server 51 provisions the CED 1 on the network, such that the remote server 51 will initiate content extraction according to the CED 1 when the remote server 51 receives a request to process content according to the CED 1 associated with the user. As an example, the identifier could be a uniform resource locator (URL) pointing to a location in the remote server 51 that the remote server 51 associates with the CED 1. The identifier can also be the identifier for finding the original structured electronic document 15 (such as the URL of the document 15), and the remote server 51 can be provisioned to initiate content extraction according to the CED 1 whenever the user uses the original URL. As a further alternative, if a remote server other than the remote server 51 is used, then the identifier could direct the electronic device 11 to the remote server. The identifier could, for example, be saved as a favorite by the user on the electronic device 11.

When the user wishes to view the content elements 13 from the structured electronic document 15 as defined in the CED 1, the user uses the identifier to initiate content extraction according to the CED 1 by the remote server 51. The remote server 51 accesses the CED 1, finds the content elements 13, and transmits them to the electronic device 11 in a form suitable for rendering to a display 1104 (see FIG. 8) for the user. Rendering may occur in a browser 40.

It is to be recognized that the computer for creating the CED 1, the electronic device for registering the CED 1 with the remote server 51, and the electronic device for viewing the content elements 13 need not be the same electronic device. (Each of these electronic devices is exemplified by the electronic device 11.) For example, the computer for creating the CED 1 can be a desktop computer. For example, the computer for registering the CED 1 could be either a desktop computer or a wireless handheld device. Requests to initiate content extraction can be made from the computer at which the user wishes to view the content elements 13. The remote server 51 can be set to recognize requests from the computer as a request from the user, provided the computer meets any authentication requirements, such as those discussed below.

The remote server 51 may be restricted to recognize requests from a particular electronic device 11 associated with the user's account, for example, a wireless handheld device 11. Similarly, transmissions in a form suitable for rendering to a display 1104 could be restricted to a particular electronic device 11 associated with the user's account, for example, a wireless handheld device 201. For example, in the case of a wireless handheld device 201, device restrictions can be enforced based on a device identification number associated with a user account. A password, cookie or other authentication technique could be used where, for example, a device serial number is not available.

The CED 1 could be registered in many ways. If using a wireless handheld device 201, the CED 1 could be downloaded to the wireless handheld device 201 for uploading to the remote server 51. Alternatively, the CED 1 could remain on the remote server 51 associated with a user's account if created there by a user. Then a user could use a wireless handheld device 11 to register the CED 1 with the remote server 51, for example, by using a web interface or sending an email to the infrastructure 51.

After successful provisioning on the remote server 51 of CED 1, once the electronic device 11 or device 201 makes a request to initiate content processing according to CED 1, the remote server 51 obtains the content elements 13 defined in the CED 1 and transmits them to the electronic device 11 or the device 201 in a form suitable for rendering to a display 1104 of the user.

The computer readable storage medium can be, for example, a random access memory, storage area network (SAN), magnetic disk drive (hard drive) or other computer-readable storage medium accessible to the remote server 51.

Further example details for creating and for using an example CED 1 for personalized content delivery have been previously set out. These details are being provided as examples only. Within the example description have been described other aspects and embodiments that have applicability beyond the creation and use of a CED 1. Within the example description have been described other aspects and embodiments that have applicability to personalized content delivery. It is to be understood that such other aspects and embodiments are included within the scope of the principles described herein, and not limited to the creation and use of a CED 1, or to personalized web delivery. Also, personalized web delivery could be carried out utilizing other forms of CED 1 created in another manner, or utilizing the techniques described herein other than with a CED 1.

In this description various aspects and embodiments of such aspects, have been described. For example, an aspect of an embodiment provides a method of outputting content of interest of a structured electronic document from a computer or distributed computer system having a processor and memory. The method includes loading a common expression and a data structure definition into memory, the common expression identifying a content element in a first structured electronic document, the data structure definition defined according to the common expression; creating in memory an instance of a data structure defined by the data structure definition; applying with the processor the common expression to a second structured electronic document to extract a content element from the second structured electronic document; storing the extracted content element in the instance of the data structure; and populating a template structured electronic document using the instance of the data structure to produce an output structured electronic document.

The method can include optimizing the output structured electronic document for delivery to a mobile electronic device. The second structured electronic document can be a result of a search performed using an input field associated with the common expression.

The common expression and data structure definition can be in a single file. The common expression is stored in a web services description language.

The method can include displaying the output structured electronic document on a display device. The display device can be part of a mobile electronic device to which the computer or distributed computer system is wirelessly connected.

In another example aspect an embodiment can provide a computer program product stored on a computer-readable medium. The computer program product includes instructions which when executed by computer or distributed computer system having a processor and memory cause the computer or distributed computer system to carry out loading a common expression and a data structure definition into memory, the common expression identifying a content element in a first structured electronic document, the data structure definition defined according to the common expression; creating in memory an instance of a data structure defined by the data structure definition; applying with the processor the common expression to a second structured electronic document to extract a content element from the second structured electronic document; storing the extracted content element in the instance of the data structure; and populating a template structured electronic document using the instance of the data structure to produce an output structured electronic document.

The instructions can be extensions of a browser forming part of the computer or distributed computer system for rendering structured electronic documents to a display device. The instructions can be instructions for a computer or distributed computer system that is a remote server, and the computer-readable medium is accessible to the remote server.

The remote server can be part of network infrastructure of a wireless network of mobile electronic devices. The instructions can have access to a DOM tree of structured electronic documents.

In a further example aspect an embodiment can provides a computer or distributed computer system. The computer or distributed computer system includes a computer program and memory on which the computer program is stored, and a processor executing in accordance with the stored computer program. The computer program includes instructions which when executed by the computer or distributed computer system cause the computer or distributed computer system to carry out loading a common expression and a data structure definition into memory, the common expression identifying a content element in a first structured electronic document, the data structure definition defined according to the common expression; creating in memory an instance of a data structure defined by the data structure definition; applying with the processor the common expression to a second structured electronic document to extract a content element from the second structured electronic document; storing the extracted content element in the instance of the data structure; and populating a template structured electronic document using the instance of the data structure to produce an output structured electronic document.

The instructions can be extensions to a browser stored in memory of the computer or distributed computer system. The computer or distributed computer system can be part of network infrastructure of a wireless network of mobile electronic devices.

Other aspects and embodiments are also described in the above description, and other aspects and embodiments will be evident from the above description.

Throughout this description various components are described along with methods and apparatuses for utilizing such components. Unless the context requires otherwise, such methods are carried out utilizing computer-readable instructions stored on a computer-readable medium accessible to a computer to cause the computer to carry out the methods. Such computer-readable instructions to carry out the methods form part of the description herein.

This description describes many different embodiments of a variety of aspects. Among other reasons, some embodiments are being described together to provide example context for ease of understanding.

Although some aspects may be incorporated within or together with other aspects, it is to be understood that the scope of the embodiments and aspects described herein is not limited to incorporation within or together with such other aspects.

As use of structured electronic documents is best known for rendering in browsers, this description typically refers to examples utilizing browsers; however, it is to be understood that the embodiments and aspects are not limited to structured electronic documents that are rendered only in browsers. For example, email clients and other applications can also render structured electronic documents through embedded rendering engines or API calls to a rendering engine.

As an example, some embodiments relate to a content extraction document (CED) 1, examples of which are discussed herein with particular reference to FIG. 3. Other embodiments relate to systems and methods that perform content extraction according to a CED 1, and still further embodiments relate to methods and tools for creating a CED 1. Further embodiments relate to methods and system that utilize a common expression to provide content elements 13 from a structured electronic document 15. Other example embodiments include methods and systems, independently or in combination, for identifying content elements 13, for selecting content elements 13, for converting elements in a path of a content element 13 to arrays, and for grouping elements in a path of a data structure associated with array elements in paths of content elements 13.

Further, it is understood that features and functions of one embodiment or aspect may be utilized in other embodiments and aspects without requiring that the description of the features and functions for the one embodiment or aspect be repeated in this description for the other embodiments and aspects.

One of skill in the art will appreciate that the methods described herein can be used with the apparatuses described herein, but could also be used with other apparatuses. Accordingly, some primary steps are presented in a generalized form that does not rely on the particular apparatuses described herein. It is noted in the description of certain steps and substeps that such steps can be performed by specific elements of the apparatuses; however, the association of steps and apparatuses is done by way of example but not limitation, and it is to be understood that these steps could be performed by other apparatuses. Moreover, the term "step" is used to refer to both the general steps associated with the methods and to more detailed substeps which can be comprised as part of a more general step. Some steps are optional. Optional substeps can be omitted or replaced by other specific method steps that implement or embody the function of the primary step. Although discrete steps are mentioned, it will be understood by one of skill in the art that in some embodiments, the functions defined in the steps can be performed as continuous processes.

The steps or operations described herein are just for example. There can be many variations to these steps or operations. For instance, the steps can be performed in a differing order, or steps can be added, deleted, or modified. Parts of one embodiment can be used in another embodiment without requiring all of the steps of any one embodiment.

The embodiments described herein are examples. Thus it will be appreciated that although the embodiments are described in terms of specific technologies, other technologies could be used to implement systems.

Although example implementations of the embodiments have been depicted and described in detail herein, it will be apparent to those skilled in the relevant art that various modifications, additions, substitutions, and the like can be made and these are therefore considered to be within the embodiments described herein.

Embodiments in other specific forms can be made without departing from the spirit or essential characteristics thereof. Certain adaptations and modifications will be obvious to those skilled in the art. Therefore, the above discussed embodiments are considered to be illustrative and not restrictive.

The invention claimed is:

1. A method of outputting content of interest of a structured electronic document from a computer or distributed computer system having a processor and memory, the method comprising:

loading a common expression and a data structure definition into memory, the common expression identifying a content element in a first structured electronic document, the data structure definition defined according to the common expression;

creating, in the memory, an instance of a data structure defined by the data structure definition;

applying, with the processor, the common expression to a second structured electronic document to extract a content element from the second structured electronic document;

storing the extracted content element in the instance of the data structure; and populating a template structured electronic document using the instance of the data structure to produce an output structured electronic document, wherein the second structured electronic document is a result of a search performed using an input field associated with the common expression.

2. The method of claim 1 further comprising optimizing the output structured electronic document for delivery to a mobile electronic device.

3. The method of claim 1, wherein the common expression and data structure definition are in a single file.

4. The method of claim 1, wherein the common expression is stored in a web services description language.

5. The method of claim 1 further comprising displaying the output structured electronic document on a display device.

6. The method of claim 5, wherein the display device is part of a mobile electronic device to which the computer or distributed computer system is wirelessly connected.

7. A computer program product comprising a computer program stored on a non-transitory computer-readable medium, the computer program comprising instructions which when executed by a computer or distributed computer system having a processor and memory cause the computer or distributed computer system to carry out:

loading a common expression and a data structure definition into memory, the common expression identifying a content element in a first structured electronic document, the data structure definition defined according to the common expression;

creating, in the memory, an instance of a data structure defined by the data structure definition;

applying, with the processor, the common expression to a second structured electronic document to extract a content element from the second structured electronic document;

storing the extracted content element in the instance of the data structure; and populating a template structured electronic document using the instance of the data structure to produce an output structured electronic document, wherein the second structured electronic document is a result of a search performed using an input field associated with the common expression.

8. The computer program product of claim 7 wherein the instructions are extensions of a browser forming part of the computer or distributed computer system for rendering structured electronic documents to a display device.

9. The computer program product of claim 7 wherein the instructions are instructions for the computer or distributed computer system that is a remote server, and the computer-readable medium is accessible to the remote server.

10. The computer program product of claim 9 wherein the remote server is part of network infrastructure of a wireless network of mobile electronic devices.

11. The computer program product of 7 wherein the instructions have access to a document object model (DOM) tree of structured electronic documents.

12. A computer or distributed computer system, the computer or distributed computer system comprising:

a computer program and memory on which the computer program is stored, a processor executing in accordance with the stored computer program, wherein the computer program comprises instructions which when executed by the computer or distributed computer system cause the computer or distributed computer system to carry out:

loading a common expression and a data structure definition into memory, the common expression identifying a content element in a first structured electronic document, the data structure definition defined according to the common expression;

creating, in the memory, an instance of a data structure defined by the data structure definition;

applying, with the processor, the common expression to a second structured electronic document to extract a content element from the second structured electronic document;

storing the extracted content element in the instance of the data structure; and populating a template structured electronic document using the instance of the data structure to produce an output structured electronic document, wherein the second structured electronic document is a result of a search performed using an input field associated with the common expression.

13. The computer or distributed computer system of claim 12 wherein the instructions are extensions to a browser stored in memory of the computer or distributed computer system.

14. The computer or distributed computer system of claim 12 wherein the computer or distributed computer system is part of network infrastructure of a wireless network of mobile electronic devices.

* * * * *